United States Patent
Jia

(10) Patent No.: US 11,290,895 B2
(45) Date of Patent: Mar. 29, 2022

(54) CUSTOMER PREMISE EQUIPMENT, ANTENNA CONTROL METHOD AND NON-TRANSITORY STORAGE MEDIUM

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/115,208

(22) Filed: Dec. 8, 2020

(65) Prior Publication Data

US 2021/0227400 A1 Jul. 22, 2021

(30) Foreign Application Priority Data

Jan. 21, 2020 (CN) .......................... 202010070347.9

(51) Int. Cl.
*H04W 16/28* (2009.01)
*H04B 17/11* (2015.01)
(Continued)

(52) U.S. Cl.
CPC ............ *H04W 16/28* (2013.01); *H01Q 1/246* (2013.01); *H04B 17/11* (2015.01); *H04B 17/21* (2015.01);
(Continued)

(58) Field of Classification Search
CPC ...... H04W 16/28; H04W 24/08; H04B 17/11; H04B 17/21; H01Q 1/246
(Continued)

(56) References Cited

U.S. PATENT DOCUMENTS 6,278,405 B1 8/2001 Ha et al.
10,277,349 B1 4/2019 Kotecha et al.
(Continued)

FOREIGN PATENT DOCUMENTS

CN 102594376 A 7/2012
CN 105142179 A 12/2015
(Continued)

OTHER PUBLICATIONS

International Search Report for International Application PCT/CN2020/142248 dated Mar. 31, 2021. (9 pages).
(Continued)

*Primary Examiner* — Ted M Wang
(74) *Attorney, Agent, or Firm* — Young Basile Hanlon & MacFarlane, P.C.

(57) ABSTRACT

A customer premise equipment, an antenna control method and a non-transitory storage medium are provided. The customer premise equipment includes a millimeter wave antenna configured to receive and transmit antenna signals, a RF circuit configured to measure a piece of network information of each antenna signal, a driver module and a processor. The processor is configured to divide a scanning range of the millimeter wave antenna into a plurality of blocks, and constructing an interval step strategy based on the plurality of blocks, control the driver module to drive the millimeter wave antenna to rotate based on the interval step strategy, acquire a plurality of pieces of network information of antenna signals measured by the millimeter wave antenna under the plurality of blocks, and determine a target block according to the plurality of pieces of network information, and control the millimeter wave antenna to rotate to the target block.

20 Claims, 11 Drawing Sheets

(51) Int. Cl.
*H04B 17/21* (2015.01)
*H01Q 1/24* (2006.01)
*H04W 24/08* (2009.01)
*H04W 84/04* (2009.01)

(52) U.S. Cl.
CPC .......... *H04W 24/08* (2013.01); *H04W 84/042* (2013.01)

(58) Field of Classification Search
USPC ..................................................... 455/422.1
See application file for complete search history.

(56) References Cited

U.S. PATENT DOCUMENTS

| | | | |
|---|---|---|---|
| 2006/0114164 A1* | 6/2006 | Iluz | H01Q 3/08 343/757 |
| 2012/0196591 A1 | 8/2012 | O'Keeffe et al. | |
| 2020/0119460 A1* | 4/2020 | Maruo | G01R 29/105 |

FOREIGN PATENT DOCUMENTS

| | | |
|---|---|---|
| CN | 105337875 A | 2/2016 |
| CN | 106792774 A | 5/2017 |
| CN | 109495911 A | 3/2019 |
| CN | 110366242 A | 10/2019 |
| CN | 110412623 A | 11/2019 |
| CN | 110515101 A | 11/2019 |
| CN | 111277293 A | 6/2020 |
| CN | 111313925 A | 6/2020 |
| WO | 2019016593 A1 | 1/2019 |
| WO | 2019199326 A1 | 10/2019 |

OTHER PUBLICATIONS

China First Office Action with English Translation for CN Application 202010070347.9 dated Feb. 5, 2021. (20 pages).
Chinese Second Office Action with English Translation for CN Application 202010070347.9 dated Jun. 24, 2021 (19 pages).
Extended European Search Report for EP Application 20216909.0 dated Jul. 5, 2021. (13 pages).
Chinese Notification to Grant Patent Right for Invention with English Translation for CN Application 202010070347.9 dated Sep. 14, 2021. (6 pages).
Extended European Search Report for EP Application 20216909.0 dated Oct. 6, 2021. (12 pages).

* cited by examiner

CUSTOMER PREMISE EQUIPMENT, ANTENNA CONTROL METHOD AND NON-TRANSITORY STORAGE MEDIUM

CROSS-REFERENCE TO RELATED APPLICATION(S)

The present application claims priority to Chinese Patent Application No. 202010070347.9, filed on Jan. 21, 2020, the entire contents of which are hereby incorporated by reference.

TECHNICAL FIELD

The present disclosure relates to the field of wireless communication technology, and in particular, to a customer premise equipment, an antenna control method and a non-transitory storage medium.

BACKGROUND

With the development of wireless communication technology, network technology is also updated. For example, 5G network is also born, and the peak theoretical transmission speed of 5G can reach tens of Gb per second, which is hundreds of times faster than the transmission speed of 4G network. Therefore, millimeter wave band with enough spectrum resources becomes one of the working frequency bands of network system (such as 5G communication system or the future public land mobile network (PLMN) system evolved after 5G communication system).

Generally, millimeter wave antenna can be fixed in the customer premise equipment for communication. The millimeter wave antenna includes a plurality of antenna modules, and the plurality of antenna modules are fixed in different positions of the customer premise equipment, which makes the radiation directions of the plurality of antenna modules different from each other. Thus, the alignment direction between the customer premise equipment and the base station can be improved. However, the cost of setting the plurality of antenna modules is high.

SUMMARY

The present disclosure provides a customer premise equipment, an antenna control method and a non-transitory storage medium.

A customer premise equipment according to some embodiments of the present disclosure is provided. The customer premise equipment includes a millimeter wave antenna configured to receive and transmit antenna signals in millimeter wave band; a radio frequency circuit coupled to the millimeter wave antenna and configured to control the millimeter wave antenna to receive and transmit the antenna signals, and measure a piece of network information of each antenna signal; a driver module coupled to the millimeter wave antenna to drive the millimeter wave antenna to rotate; a processor coupled to the radio frequency circuit and the driver module, respectively. The processor is configured to divide a scanning range of the millimeter wave antenna into a plurality of blocks, and constructing an interval step strategy based on the plurality of blocks, control the driver module to drive the millimeter wave antenna to rotate based on the interval step strategy to scan the plurality of blocks at intervals, acquire a plurality of pieces of network information of the antenna signal measured by the millimeter wave antenna under the plurality of blocks, and determine a target block of the millimeter wave antenna according to the plurality of pieces of network information, and control the millimeter wave antenna to rotate to the target block.

An antenna control method according to some other embodiments of the present disclosure is provided. The antenna control method is applied to a customer premise equipment. The customer premise equipment comprises a millimeter wave antenna configured to receive and transmit antenna signals in millimeter wave band; a radio frequency circuit coupled to the millimeter wave antenna and configured to control the millimeter wave antenna to receive and transmit the antenna signals, and measure a piece of network information of each antenna signal; a driver module coupled to the millimeter wave antenna to drive the millimeter wave antenna to rotate; and a processor coupled to the radio frequency circuit and the driver module. The method includes dividing a scanning range of the millimeter wave antenna into a plurality of blocks, and constructing an interval step strategy based on the plurality of blocks; controlling the driver module to drive the millimeter wave antenna to rotate based on the interval step strategy to scan the plurality of blocks at intervals; acquiring a plurality of pieces of network information of an antenna signal measured by the millimeter wave antenna under the plurality of blocks; and determining a target block of the millimeter wave antenna according to the plurality of pieces of network information, and control the millimeter wave antenna to rotate to the target block.

A non-transitory storage medium according to some other embodiments of the present disclosure is provided. The non-transitory storage medium stores instructions that when executed, cause a processor to perform: cause the processor to perform: dividing a scanning range of the millimeter wave antenna into a plurality of blocks, and constructing an interval step strategy based on the plurality of blocks; controlling the driver module to drive the millimeter wave antenna to rotate based on the interval step strategy to scan the plurality of blocks at intervals; acquiring a plurality of pieces of network information of an antenna signal measured by the millimeter wave antenna under the plurality of blocks; and determining a target block of the millimeter wave antenna according to the plurality of pieces of network information, and control the millimeter wave antenna to rotate to the target block.

BRIEF DESCRIPTION OF DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

Figure 1:
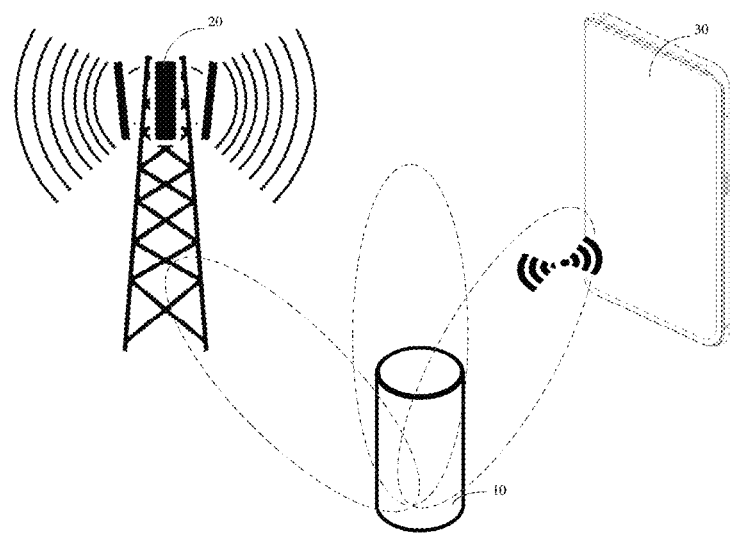
FIG. 1 is a schematic view of a structure of a network system architecture according to some embodiments of the present disclosure.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the present disclosure will be more fully understood.

In the present disclosure, the expression "configured to" and the like used in the present disclosure may be associated with, such as, "applicable to", "used to", "able to", "designed to" and so on. In some cases, the expression "device/equipment/element configured to" may imply that the device/equipment/element may be used with other devices or components to be "able to" realize a function. For example, "processor configured to perform A, B, and C" may imply a processor for performing a corresponding operation by executing one or more software programs stored in a storage device.

Referring to FIG. 1, FIG. 1 is a schematic view of a structure of network system architecture according to some embodiments of the present disclosure. In the network system architecture as shown in FIG. 1, a customer premise equipment 10 which may also be called as a Network Communication Terminal, or a wireless router CPE may be connected to a first base station in a first network system and access to a core network through the first base station 20. The customer premise equipment 10 may be used to realize a network access function, convert operator's public network WAN to user's home LAN, and can support a plurality of mobile terminals 30 to access a network at the same time.

In addition, a cell and a second base station of a second network system may be deployed in vicinity of the customer premise equipment 10, or the cell and the second base station of the second network may not be deployed in vicinity of the customer premise equipment 10. The first network system may be different from the second network system, for example, the first network system may be a 4G system, and the second network system may be a 5G system, or, the first network system may be a 5G system, and the second network system may be a future PLMN system evolved after 5G. Communication systems of the first network system and the second network system are not limited in the embodiments of the present disclosure.

When the customer premise equipment 10 accesses to the 5G system, the customer premise equipment 10 can transmit and receive data with a corresponding base station through a beam formed by 5G millimeter wave antennas. The beam needs to be aligned with an antenna beam of the corresponding base station, which can facilitate the customer premise equipment 10 to transmit uplink data to the base station or receive downlink data transmitted by the base station.

Figure 2:
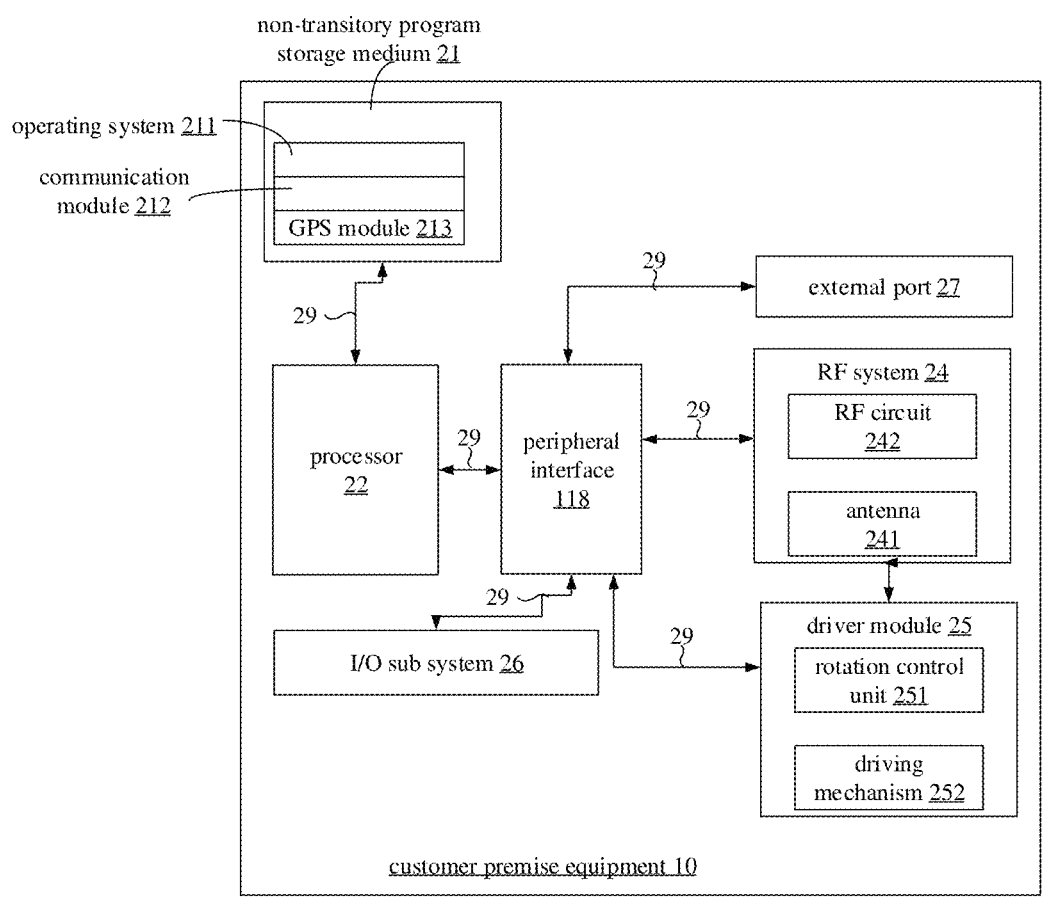
FIG. 2 is a schematic view of an internal structure of a customer premise equipment according to some embodiments of the present disclosure.

The customer premise equipment 10 may be used to realize the network access function, convert operator's public network WAN to user's home LAN. Internet broadband access modes may include fiber to the home (FTTH), digital subscriber line (DSL), cable, Mobile (i.e., wireless customer premise equipment (CPE)) and so on. The customer premise equipment 10 may be a mobile signal access device that receives mobile signals and transmits wireless WiFi signals formed by converting the mobile signals. The customer premise equipment 10 may be also a device that converts high-speed 4G or 5G signals into WiFi signals and can support the plurality of mobile terminals 30 to access the network at the same time. Referring to FIG. 2, a customer premise equipment is provided according to some embodiments of the present disclosure. The customer premise equipment 10 may include a non-transitory program storage medium 21 (including at least one computer readable storage medium), a processor 22, a peripheral interface 23, a radio frequency (RF) system 24, a driver module 25, and an input/output (I/O) sub system 26. These components may communicate over one or more communication buses or signal lines 29. It should be understood by those skilled in the art that the customer premise equipment shown in FIG. 2 is to make the technical solution described in the embodiment of the present disclosure more clearly, but not for limitation. The customer premise equipment may include more or less components than those shown in FIG. 2, or combine some components, or have different components arrangements. The components shown in FIG. 2 may be hardware, software, or a combination of both, including one or more signal processing programs and/or application specific integrated circuits.

The non-transitory program storage medium 21 may include a high-speed random access memory and may also include a non-volatile memory, such as one or more disk storage devices, flash memory devices, or other non-volatile solid-state memory devices. In some embodiments, software components stored in the non-transitory program storage medium 21 may include an operating system 211, a communication module (or instruction set) 212, a global positioning system (GPS) module (or an instruction set) 213, and the like.

The processor 22 and other control circuits (the control circuit in the RF system 24) may be configured to control operations of the customer premise equipment 10. The processor 22 and other control circuits may constitute a processing circuit system. The processing circuit system can be based on one or more microprocessors, micro controllers, digital signal processors, baseband processors, power management units, audio decoder chips, application specific integrated circuits (ASIC), etc.

The processor 22 may be configured to implement a control algorithm that controls the use of an antenna in the customer premise equipment 10. For example, the processor 22 may be configured to control the driver module 25 to rotate the millimeter wave antenna to a target block for transmitting and/or receiving signals.

The I/O sub system 26 couples input/output peripherals such as keypads and other input control devices on the customer premise equipment 10 to a peripheral interface 118. The I/O sub system 26 may optionally include a touch screen, a button, a joystick, a trackpad, a keypad, a keyboard, a tone generator, an accelerometer (motion sensor), an ambient light sensor and other sensors, light emitting diodes and other status indicators, data ports, etc. The user may control the operation of the customer premise equipment 10 by supplying commands via the I/O subsystem 26, and may receive status information and other outputs from the customer front-end device 10 using the output resources of the I/O sub system 26.

The external port 27 may be an Ethernet card or a wireless network card and the like for communicating with an external electronic device.

The RF system 24 may include an antenna 241, which may be formed by any suitable type of antenna. For example, the antenna 241 may include an antenna having a resonant element formed by at least one of an antenna structure such as an array antenna structure, a loop antenna structure, a patch antenna structure, a slot antenna structure, a helical antenna structure, a stripline antenna, a monopole antenna, a dipole antenna, and the like. Different types of antennas can be used for transmitting and receiving different frequency bands and band combinations. The customer premise equipment 10 may include a plurality of antennas, for example, a millimeter wave antenna for transmitting and receiving millimeter wave bands, a plurality of 5G antennas for receiving and transmitting sub-6 GHZ frequency bands, and a plurality of 2G/3G/4G antennas for receiving and transmitting 2G, 3G and 4G frequency bands. These antennas can be directional antennas, non-directional antennas, fixed antennas, or rotationally adjustable antennas.

In some embodiments, millimeter wave antenna can include an millimeter wave antenna array and a radio frequency transceiver chip. The millimeter wave antenna array may realize receiving and transmitting millimeter wave signal, and a millimeter wave RF transceiver chip may realize up conversion and down conversion processing of millimeter wave signal. Furthermore, the millimeter wave antenna array and RF transceiver chip can be arranged on the same printed circuit board (PCB) to reduce the insertion loss during millimeter wave signal transmission and improve the RF performance.

The RF system 24 may also include a plurality of RF circuits 242 for processing RF signals of different frequency bands. For example, a satellite positioning RF circuit for receiving 1575 MHz satellite positioning signal, a WiFi and Bluetooth transceiver RF circuit for processing IEEE 802.11 communication in 2.4 GHz and 5 GHz bands, and a cellular phone transceiver RF circuit for handling wireless communications in cellular phone frequency bands (such as 850 mhz, 900 MHz, 1800 MHz, 1900 MHz and 2100 MHz, or other 5G millimeter wave, sub-6G frequency band).

Figure 3:
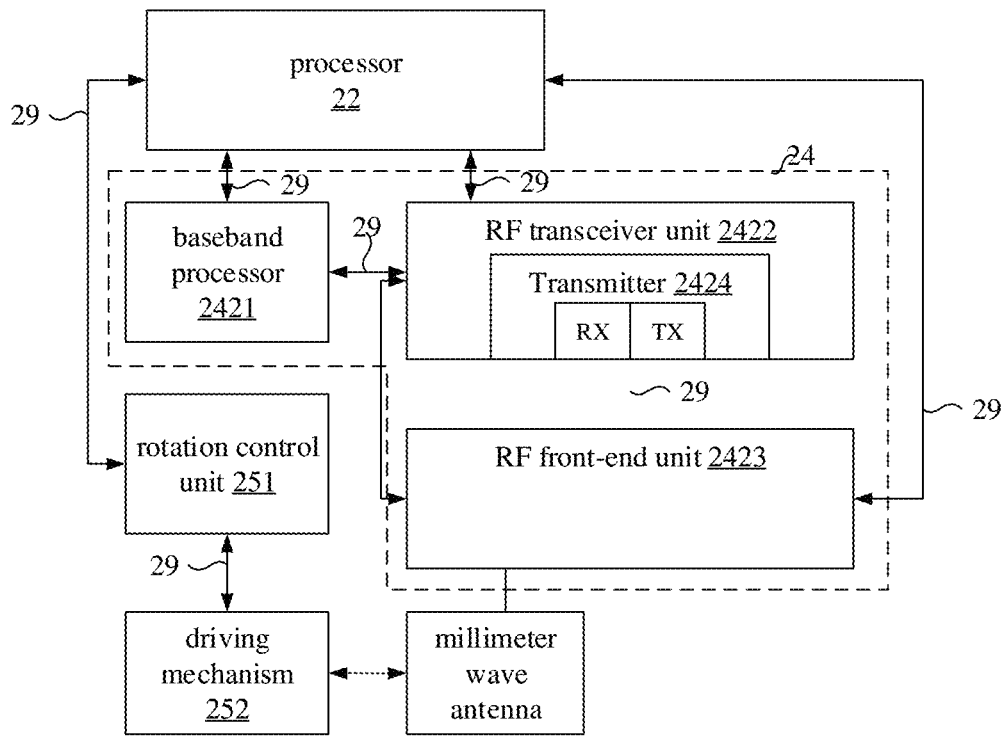
FIG. 3 is a schematic view of an internal structure of a customer premise equipment according to some other embodiments of the present disclosure.

Referring to FIG. 3, in some embodiments, the RF circuit 242 may also include a baseband processor 2421, a RF transceiver unit 2422, and a RF front-end unit 2423. The baseband processor 2421 may provide network information to the processor 22. The network information may include raw and processed information associated with the wireless performance measurement of received antenna signals, such as a receiving power, a transmitting power, a reference signal receiving power (RSRP), a reference signal receiving quality (RSRQ), and a received signal strength indicator (RSSI), a signal to noise ratio (SNR), a rank of multiple-input multiple-output (MIMO) channel matrix and a carrier to interference plus noise (RS-CINR), a frame error rate, a bit error rate, channel quality measurement based on signal quality data (such as Ec/Lo or c/No data), information about whether a response corresponding to a request from the mobile terminal is being received from the base station, information about whether a network access process is successful, and so on.

The processor 22 may analyze the received network information, and in response, the processor 22 (or the baseband processor 2421) may issue control commands for controlling the RF system 24 or a driving mechanism. For example, the processor 22 may issue a control command to control the driving mechanism to drive the millimeter wave antenna to rotate.

The RF transceiver unit 2422 may include at least one RF transceiver, for example at least one transceiver 2424 (such as at least one transceiver shared between antennas, a transceiver corresponding to an antenna, and the like). In some embodiments, the at least one transceiver 2424 may include at least one transmitter (e.g. a transmitter TX) or a receiver (e.g. a receiver Rx). That is, the at least one transceiver 2424 may include a transmitter (e.g. a transmitter TX) and a receiver (e.g. a receiver Rx), or may include only a receiver (e.g. a receiver Rx) or only a transmitter (e.g. a transmitter TX). For example, the transceiver can be used for frequency conversion between an intermediate frequency signal and a baseband signal, or/and for realizing the frequency conversion processing between an intermediate frequency signal and a high frequency signal, etc.

The baseband processor 2421 may receive digital data to be transmitted from the processor 22, and may also transmit corresponding antenna signals through the RF transceiver unit 2422. The RF front-end unit 2423 may be coupled between the RF transceiver unit 2422 and the antenna 241, and may be used to transmit RF signals generated by transmitters 2424 and 2426 to the antenna 241. The RF front-end unit 2423 may include a RF switch, an impedance matching circuit, a filter, and other circuits for forming an interface between the antenna 241 and the RF transceiver.

The driver module 25 may include a rotation control unit 251 (such as a microprocessor or a microcontroller, or a corresponding control circuit) and a driving mechanism 252. The millimeter wave antenna may be mounted on the driving mechanism 252 and can be driven to rotate by the driving mechanism 252 under the control of the rotation control unit 251. Specifically, a rotation axis of the millimeter wave antenna may extend along a length direction of the customer premise equipment 10. In the process of the millimeter wave antenna rotating around the rotation axis, each rotation can change a direction of a radiation surface of the millimeter wave antenna, which will finally realize 360 degrees rotation of the millimeter wave antenna in a horizontal plane for omni-directional scanning.

Specifically, radiation surface of the millimeter wave antenna can be arranged in parallel with the rotation axis.

The radiation surface of the millimeter wave antenna can be understood as the plane of the radiation patch in the millimeter wave antenna.

Furthermore, the driving mechanism 252 may include a detection assembly for measuring a rotation angle of the millimeter wave antenna in the scanning range. Specifically, the detection assembly may include a magnet and a magnetic coding chip. In the embodiment of the present disclosure, when rotating, the millimeter wave antenna can drive the magnet to rotate, thus causing a magnetic field change. The magnetic coding chip can accurately measure the magnetic field change caused by a magnet rotation, and then accurately record the rotation angle of the millimeter wave antenna, which forms a closed-loop control.

After the millimeter wave antenna rotates for one cycle and the network information within 360 degrees is measured, combining with the rotation angle information recorded by the magnetic coding chip, the processor 22 may obtain a best block for the millimeter wave antenna to receive the network signals. The processor 22 can send a corresponding control instruction to the rotation control unit 251 to control the driving mechanism 252 to drive the millimeter wave antenna to rotate to the best block for the millimeter wave antenna receiving the network signals. Specifically, in some embodiments, an absolute zero point can be set by the magnetic coding chip, and take the absolute zero point as an initial position. The rotation angle of the millimeter wave antenna in a current position relative to the initial position can be recorded. Certainly, in other embodiments, an angle measurement method can also be used to record the rotation angle between a current position and a last position of the millimeter wave antenna.

In some embodiments, the processor 22 may be configured to divide a scanning range of the millimeter wave antenna into a plurality of blocks, and construct an interval step strategy based on the plurality of blocks. The processor 22 may also be configured to control the driver module 25 to drive the millimeter wave antenna to rotate based on the interval step strategy to scan the plurality of blocks at intervals and acquire a plurality of pieces of network information of antenna signals measured by the millimeter wave antenna under the plurality of blocks. The processor 22 may also be configured to determine a target block of the millimeter wave antenna according to the plurality of pieces of network information, and control the millimeter wave antenna to rotate to the target block.

In some embodiments, the scanning range of the millimeter wave antenna may be 360 degrees omni-directional in a horizontal plane. That is, the driving mechanism 252 can drive the millimeter wave antenna to realize 360 degrees omni-directional rotation.

The processor 22 may be configured to obtain the corresponding number of blocks according to the scanning range of the millimeter wave antenna. The scanning ranges of the plurality of blocks may be the same, that is, included angles of the scanning ranges corresponding to the plurality of blocks may be also equal. An included angle of a corresponding scanning range of each block can be 180 degrees, 120 degrees, 90 degrees, 75 degrees, 60 degrees, 45 degrees, 30 degrees, 15 degrees, and so on. The included angle of a corresponding scanning range of each block may be represented by A. According to the included angle of each block, the number of the blocks can be obtained and the number may be represented by a. The formula for calculating the number may be $a=360/A$. For example, when the included angle of the corresponding scanning range is 180 degrees, a corresponding number may be 2, and the millimeter wave antenna can rotate twice to achieve omni-directional coverage. When the included angle of the corresponding scanning range is 120 degrees, the corresponding number may be 3, and the millimeter wave antenna can rotate three times to achieve omni-directional coverage. When the included angle of the corresponding scanning range is 90 degrees, the corresponding number may be 4, and the millimeter wave antenna can rotate four times to achieve omni-directional coverage. When the included angle of the corresponding scanning range is 75 degrees, the corresponding number may be 5, and the millimeter wave antenna can rotate five times to achieve omni-directional coverage.

It should be noticed that the specific value of the scanning range corresponding to each block is not further limited. Specifically, the included angle of the corresponding scanning range of each block is smaller than a preset angle. In some embodiments, the preset angle can be 120 degrees. According to the omni-directional coverage strategy, the number of the blocks may be greater than 3.

In some embodiments, the scanning range of the millimeter wave antenna rotation may be Φ and Φ may be less than 360 degrees. That is, the driving mechanism 252 can drive the millimeter wave antenna to rotate to scan a part of azimuth to realize partial coverage rotation. Specifically, the processor 22 may be configured to obtain the corresponding number of the plurality of blocks according to the scanning range of the millimeter wave antenna rotation. The scanning ranges corresponding to the plurality of blocks may be the same, that is, the included angles of the scanning ranges corresponding to the plurality of blocks may be also equal. According the included angle of the scanning range corresponding to each block, the number of the plurality of blocks can be obtained. The included angle of a corresponding scanning range of each block may be represented by A. The number of the plurality of blocks may be represented by b. The formula for calculating the number may be that $b=Φ/A$.

Furthermore, the driving mechanism 252 can drive the millimeter wave antenna to realize 360 degrees omni-directional coverage rotation or partial coverage rotation according to a rotation step. The rotation step may be represented by n. The rotation step may be less than or equal to the scanning range of the block. For example, when the scanning range of the block is 30 degrees, the corresponding rotation step may be 5 degrees, 10 degrees, 15 degrees, 30 degrees, and so on. In some embodiments of the present disclosure, the scanning range of the block and the rotation step can be set to be equal.

It should be noticed that the rotation step may be determined by the scanning coverage and spectrum characteristics of the millimeter wave antenna. The wider the scanning coverage of the millimeter wave antenna is, the larger the rotation step is.

The processor 22 may be configured to construct an interval step strategy based on the plurality of the blocks. Specifically, the processor 22 may be configured to obtain the scanning range of each block, determine a step value according to the scanning range of each block, and determine the interval step strategy according to the step value.

In some embodiments, the interval step strategy can be understood as that in the rotation process, stepping from the current block to the next block in an interval step rotation rather than in a clockwise or counterclockwise direction rotation. Interval step rotation can be understood that as the step rotation between the current block and the previous block by skipping one or more blocks, or the step rotation between the current block and the next block by skipping one or more blocks.

In some embodiments, the interval step strategy is to control the driving mechanism 252 to drive the millimeter wave antenna to rotate in the order of the first block, the second block and the third block . . . the a-th block. The first block and the second block do not step in a clockwise or counterclockwise direction, but in an interval step rotation, that is, there is an interval between the first block and the second block. The interval between the first block and the second block may be a step value. It is supposed that the current block may be block I, the previous block can be the block I−1, and the next block can be the block I+1. In some embodiments, when the scanning range corresponding to each block is 75 degrees, the corresponding number of the blocks may be 5, and each block can be identified in a clockwise or counterclockwise direction, for example, blocks 1, 2, 3, 4, and 5 can be identified. Furthermore, the step value can be determined according to the scanning range corresponding to each block. The step value can be understood as the scanning range between the current block and the previous block. The step value may be a scanning range corresponding to at least one block.

Figure 4A:
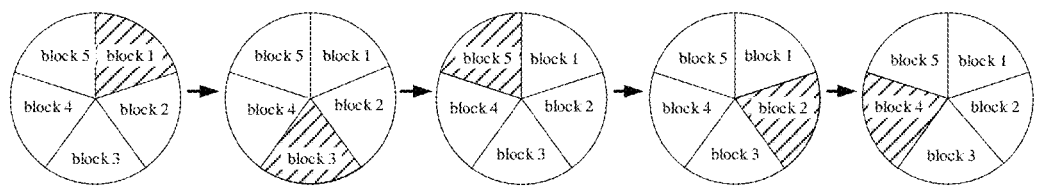
FIG. 4a is a step sequence view of an interval step strategy according to some embodiments of the present disclosure.
Figure 4B:
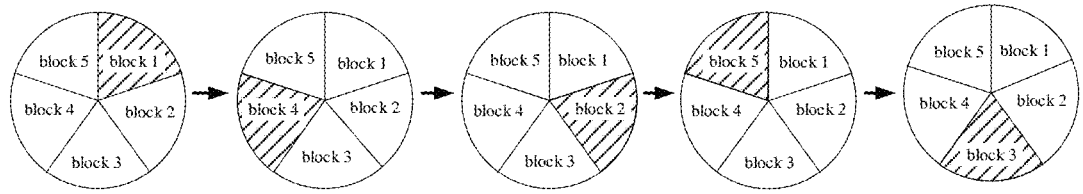
FIG. 4*b* is a step sequence view of an interval step strategy according to some other embodiments of FIG. 4*a* of the present disclosure.

Referring to FIG. 4a and FIG. 4b, in some embodiments, when the step value is a scanning range corresponding to one block, the interval step strategy according to the step value may be to control the millimeter wave antenna to rotate in the order of block 1, block 3, block 5, block 2, block 4, or in the order of block 1, block 4, block 2, block 5, block 3.

Figure 5A:
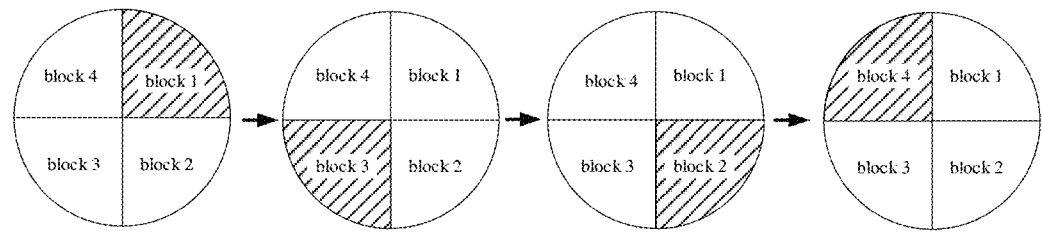
FIG. 5*a* is a step sequence view of an interval step strategy according to some other embodiments of the present disclosure.
Figure 5B:
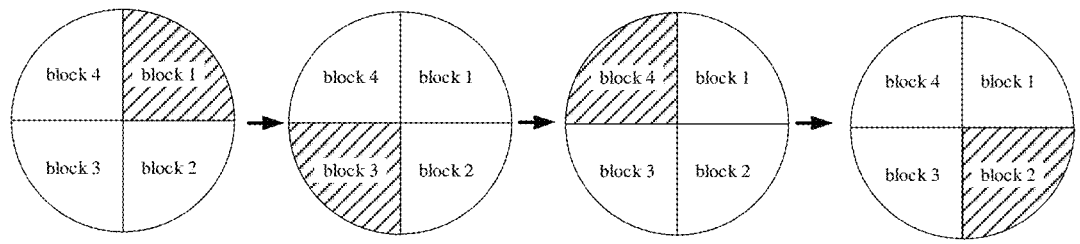
FIG. 5*b* is a step sequence view of an interval step strategy according to some other embodiments of FIG. 5*a* of the present disclosure.

Referring to FIG. 5a and FIG. 5b, in some embodiments, when the scanning range corresponding to each block is 90 degrees, the corresponding number of the blocks may be 4, and each block can be identified in a clockwise or counterclockwise direction, for example, blocks 1, 2, 3, and 4 can be identified. When the step value is a scanning range corresponding to one block, the interval step strategy according to the step value may be to control the millimeter wave antenna to rotate in the order of block 1, block 3, block 2, block 4. In this instance, block 3 and bock 2 can be considered to be separated by block 4 and block 1. Or the interval step strategy according to the step value may be to control the millimeter wave antenna to rotate in the order of in the order of block 1, block 3, block 4, block 2. In this instance, block 3 and block 4 can be considered to be separated by block 2 and block 1.

Figure 6:
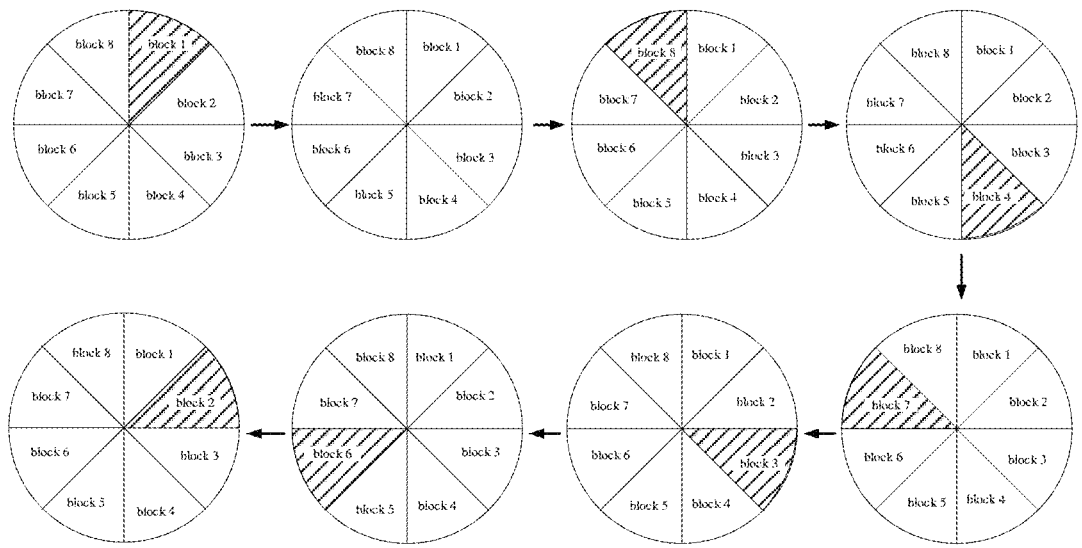
FIG. 6 is a step sequence view of an interval step strategy according to some other embodiments of the present disclosure.

Referring to FIG. 6, in some embodiments, when the scanning range corresponding to each block is 45 degrees, the corresponding number of the blocks may be 8, and each block can be identified in a clockwise or counterclockwise direction, for example, blocks 1, 2, 3, 4, 5, 6, 7, and 8 can be identified. The step value can be determined according to the scanning range corresponding to each block. The number of the step value can be two. One step value may be a scanning range corresponding to two blocks, and the other step value may be a scanning range corresponding to three blocks. The interval step strategy according to the step value may be to control the millimeter wave antenna to rotate in the order of block 1, block 5, block 8, block 4, block 7, block 3, block 6, and block 2. It should be noticed that the block 1 may be the starting block. An initial position of the block 1 is not limited and can be any position of 360 degrees circumference. According to the omni-directional coverage strategy, an area of the 360 degrees omni-directional direction can be divided into a plurality of blocks. The number of the plurality of blocks may be represented by a. When stepping from the (a−2)-th block to the (a−1)-th block or the a-th block, only sequential step rotation can be achieved, then the millimeter wave antenna rotation can be controlled according to a sequential step.

Furthermore, the step value can be set according to the scanning range corresponding to the block and the number a of the blocks. When the starting block steps to the next block relative to the starting block, the step value between the starting block and the next block can be the scanning range corresponding to (a−1)/2−1 blocks, or the scanning range corresponding to a/2−1 blocks. In some embodiments, when the interval step strategy according to the step value is to control the millimeter wave antenna to rotate in the order of block 1, block 5, block 8, block 4, block 7, block 3, block 6, block 2. The block 1 is starting block, and the block 5 is the next block relative to the starting block.

In some embodiments, when the millimeter wave antenna is rotating, the RF circuit can measure the network information of the antenna signal received by the millimeter wave antenna under each block. The processor 22 may be configured to obtain a piece of network information of the antenna signal received by the millimeter wave antenna under each block from the RF circuit. In some embodiments, the antenna signal may be millimeter wave signal. When the millimeter wave antenna is rotating, the RF circuit can measure the piece of network information of the millimeter wave signal received by the millimeter wave antenna under each block.

Specifically, the piece of network information of the antenna signal measured under each block can be understood as the piece of network information of the antenna signal measured corresponding to any rotation angle in each block, or an average of a plurality of pieces of network information of the antenna signal measured corresponding to a plurality of rotation angles in each block, or a maximum network information of antenna signal measured corresponding the plurality of rotation angles in each block.

Alternatively, the piece of network information of the antenna signal measured under the current block can be understand as the piece of network information measured at the rotation angle corresponding to the critical points between the current block and the next block. For example, the piece of network information measured under the i-th block can be understood as the piece of network information measured at the rotation angle corresponding to the critical points between the i-th block and the i+1-th block.

The rotation angle can be understood as the rotation angle of the millimeter wave antenna from the initial position to the current position.

In some embodiments, the absolute zero point can be set by the magnetic coding chip, and the absolute zero point can be taken as the initial position, and the magnetic coding chip can record the rotation angle between the current position and the initial position of the millimeter wave antenna. Certainly, in other embodiments, an angle measurement method can also be used to record the rotation angle between the current position and the last position of the millimeter wave antenna. The rotation angle can be a vector, including horizontal rotation angle.

The piece of network information may include at least one signal parameter such as a reference signal receiving power (RSRP), a reference signal receiving quality (RSRQ), a received signal strength indicator (RSSI), and a signal to noise ratio (SNR), and rank of MIMO channel matrix of the antenna signal. In the embodiment of the present disclosure, the specific information of the piece of network information is not further limited.

In some embodiments, the processor 22 is also configured to determine a target block of the millimeter wave antenna according to the plurality of pieces of network information and control the millimeter wave antenna to rotate to the target block. The processor 22 can control the millimeter wave antenna to rotate in 360 degree omni-directional according to the interval step strategy, so as to search the omni-directional new radio (NR) cell and measure a plurality of pieces of network information of the antenna signal based on the millimeter wave antenna module in different blocks. Furthermore, the processor can also record the measured plurality of pieces of network information, and then determine the target network information from the plurality of pieces of network information. The block corresponding to the target network information may be the target block.

In some embodiments, a reference signal parameter may be selected from at least one signal parameter of the plurality of pieces of network information, and a reference signal parameter with a maximum value may be selected from the plurality of pieces of network information, and the reference signal parameter with the maximum may be taken as the target network information. In the embodiment of the present disclosure, the reference signal receiving power as the piece of network information can be taken as an example to explain. That is to say, processor 22 can be configured to obtain a plurality of reference signal receiving power of millimeter wave antenna under the plurality of blocks, obtain the maximum value of reference signal receiving power, and take the reference signal receiving power with maximum value as the target network information. The block corresponding to the target network information may be the target block. After obtaining the target block, the millimeter wave antenna can be rotated to the target block, so that the millimeter wave antenna can accurately aim at the base station.

In the embodiment, the processor 22 may be configured to control the driving mechanism 252 to drive the millimeter wave antenna rotation based on the interval step strategy, so as to measure the plurality of pieces of network information of antenna signals in corresponding to different blocks. The processor 22 may also control the millimeter wave antenna to rotate rapidly to the target block, that is, automatically adjust the radiation direction of the millimeter wave antenna. Thus, the millimeter wave antenna can accurately align with the antenna beam of the base station, which can improve the alignment efficiency and communication quality. At the same time, the number of millimeter wave antennas can be reduced. With only one millimeter wave antenna, a wide range of coverage can be achieved and the cost can be reduced. Besides, processor 22 may be configured to control the driving mechanism 252 to drive the millimeter wave antenna to rotate based on the interval step strategy. The coherence of the two adjacent step rotations may be minimum, the signal interference may be reduced, and the omni-directional NR cell search can be completed quickly. In some embodiments, the processor 22 may be further configured to obtain the two pieces of network information measured by the millimeter wave antenna in the current block and the previous block, and to update the interval step strategy according to the two pieces of network information measured by the millimeter wave antenna in the current block and the previous block.

In some embodiments, when the included angle of each block is 90 degrees, the corresponding number of the blocks is 4, and each block can be identified in a clockwise or counterclockwise direction, for example, blocks 1, 2, 3, 4 may be identified. The corresponding interval step strategy may be to control the millimeter wave antenna to rotate in the order of block 1, block 3, block 2, and block 4.

The processor 22 can be configured to obtain network information under block 1 and block 3 from the RF circuit. If reference signal parameter of network information under block 3 is greater than that under block 1, target block may be determined in block 2, block 3 and block 4. If reference signal parameter of network information under block 1 is greater than that under block 3, the target block may be determined in block 1, block 2 and block 4.

For example, when the target block needs to be determined in block 2, block 3 and block 4, the interval step strategy can be changed to control the millimeter wave antenna to rotate in the order of block 1, block 3, block 4, block 2. If the reference signal parameter under block 4 is greater than that under block 3, block 4 may be taken as the target block. Under these circumstances, the customer premise equipment 10 no longer controls the millimeter wave antenna to rotate. If the reference signal parameter under block 3 is greater than that under block 4, the millimeter wave antenna may be controlled to rotate in the order of block 3, block 2, and the interval step strategy may be changed to block 1, block 3, block 2. If the reference signal parameter under block 3 are greater than that under block 2, block 3 may be taken as the target block, and the interval step strategy is changed to block 1, block 3.

The customer premise equipment 10 can control the millimeter wave antenna to rotate according to the updated interval step strategy, and can obtain the target block after searching some blocks, which improves the speed of determining the target block and the efficiency of searching the network.

In some embodiments, the millimeter wave antenna may include a plurality of radiation units. According to the amplitude and phase of the antenna signal received by the radiation units, the RF circuit can control the angle of the radiation beam of the radiation unit, so that the plurality of radiation units may receive a plurality of antenna signals to synthesize a beam with a certain direction angle.

In some embodiments, the plurality of radiation units may be treated as a whole, thus the processor 22 may be configured to obtain a piece of network information of antenna signal received by each radiation unit from the RF circuit, and then can comprehensively figure out network information of antenna signals received by the plurality of radiation units in the current direction of rotation. A figured out network information can be understood as an average value, a maximum value, etc. of a plurality of pieces of network information of antenna signals received by multiple radiation units. It should be noticed that in the embodiment of the present disclosure, the meaning of the figured out network information is not further limited.

The processor 22 may be further configured to obtain a plurality of network data packets of the antenna signal received by the corresponding plurality of radiation units in the current block, the network data packets may include the signal quality information of the antenna signal received by each radiation unit in different directions; and updating the interval step strategy according to the plurality of network data acquired by the plurality of radiation units under the current block.

In some embodiments, the millimeter wave antenna may include four radiation units, which can be arranged in one-dimensional linear array in the same plane, or arranged in a 2×2 two-dimensional array. Position information of the four radiation units can be respectively represented by $P_1$ (x, y), $P_2$ (x, y), $P_3$ (x, y), $P_4$ (x, y). Only one of the four radiation units may be working at the same time. The RF circuit can obtain the signal quality information of antenna signals received by the radiation unit in different directions when any radiation unit is working.

In some embodiments, the processor 22 may be configured to obtain network packets of each radiation unit, represented by $Q_{P1}$, $Q_{P2}$, $Q_{P3}$, and $Q_{P4}$, respectively. At the same time, the network data packet can include the spatial position information of each radiation unit and the beam directivity information of each radiation unit in each direction, that is, the signal quality information of the millimeter wave antenna received by each radiation unit in all directions.

The processor 22 may be configured to update the interval step strategy based on the plurality of network data acquired by the plurality of radiation units under the current block. Specifically, the processor 22 can be configured to filter out the maximum $Q_{max}$ among the four network packets $Q_{P1}$, $Q_{P2}$, $Q_{P3}$, and $Q_{P4}$, and the target radiation unit is determined after obtaining the maximum $Q_{max}$. The customer premise equipment 10 can obtain the spatial position information of the target radiation unit and the signal quality of the beam in each direction according to the target radiation unit. At the same time, the azimuth corresponding to the beam with the maximum signal quality may be determined. Taking the azimuth as the target tracking azimuth, the processor 22 can be configured to obtain the block of the next component of the millimeter wave antenna according to the target tracking azimuth, and then update the interval step strategy.

The customer premise equipment 10 can control the rotation of the millimeter wave antenna by combining the spatial position information of the radiation units of the current millimeter wave antenna and a piece of network information received by each transceiver unit, which may have high coupling degree. The efficiency of 360 degrees omni-directional measurement can be improved.

In some embodiments, the customer premise equipment 10 can work in a non-independent network mode or in an independent network mode. The third generation partnership project (3GPP) defines two schemes for 5G new radio (NR) network, namely stand alone (SA) network and non-stand alone (NSA) network. When the customer premise equipment 10 needs 5G communication, the customer premise equipment 10 can access the cell with the ability to support non-independent networking or independent networking, and access the air port of NR according to different networking methods, so as to enjoy 5G service.

When the customer premise equipment 10 works in a non-independent network mode, the processor 22 may be further configured to receive a measurement instruction sent by a base station based on the first network system. The measurement instruction may at least include an instruction configured by the base station to instruct the customer premise equipment 10 to measure the time information of the antenna signal supported by the second network system. The first network system may be 4G network system and the second network system may be 5G network system. According to the measurement instruction, the driving mechanism 252 may be controlled to drive the millimeter wave antenna to rotate based on the interval step strategy.

Specifically, the processor 22 may be configured to actively initiate the network access process of the first network system and reside in the first network system. When successfully residing in the first network system, the customer premise equipment 10 can receive the measurement instruction sent by the base station through the first network system. The measurement instruction shall at least include the time information configured by the base station and the network access threshold value for the customer premise equipment 10 resident the second network system. The time information may be used to instruct the customer premise equipment 10 to measure the time of the second network system. In some embodiments, the time information may be periodic information or a periodic information for the customer premise equipment 10 to measure the second network system. The periodic information may be the interval between the start time of first measurement and the start time of second measurement, or the interval between the end time of the first measurement and the start time of the second measurement, or the time interval between the end time of the first measurement and the end time of the second measurement when the customer premise equipment 10 performs the two adjacent measurements.

The first network system and the second network system can correspond to different frequency band range. In some embodiments, the first network system may be 4G network, and the corresponding network system may be LTE system. The second network system may be 5G network, and the corresponding network system may be 5G NR system.

The measurement instructions are configured by the base station. The base station can set different time information according to the density of networks of the NR system. In some embodiments, the time information can be 1 second, 5 seconds, 10 seconds, etc. For example, when the base station determines that the networks of the NR cell around the LTE cell where the customer premise equipment 10 is located are densely distributed, and the NR system has good coverage of an area where the customer premise equipment 10 is located, the base station can control the customer premise equipment 10 to measure the time information of the second network system longer, so as to better reduce the power consumption of the customer premise equipment 10. When the base station determines that the networks of the NR cell layout around the LTE cell where the customer is located are sparsely distributed, the base station can control the customer premise equipment 10 to measure the time information of the second network system shorter, so as to ensure that the customer premise equipment 10 can detect the coverage of the second network system in time.

Alternatively, when the network where the customer premise equipment 10 resides is the first network system (4G network), and the second network system can be 5G network. The first network system (LTE system) may support NSA function, that is, support joint networking with the second network system (NR system).

Specifically, when the processor 22 is configured to control the millimeter wave antenna to rotate according to the measurement instruction and correspondingly obtain the piece of network information of the antenna signal measured by the millimeter wave antenna under each block, the customer premise equipment 10 can control the millimeter wave antenna to rotate according to the time information in the measurement instruction to search for NR cells. Each time the millimeter wave antenna rotates, the piece of network information of antenna signal can be measured once under each block.

The processor 22 may be configured to measure the antenna signal periodically according to the measurement instructions configured by the base station, which can avoid the disadvantage of increasing the customer premise equipment 10 power consumption caused by real-time and continuous measurement of antenna signal.

In some embodiments, when the time information received by the customer premise equipment 10 meets the condition of quitting network, the processor 22 may also be configured to quit the first network system and re-reside in the first network system to receive the measurement instructions sent by the base station again.

The time information can be periodic information and aperiodic information. When the time information is aperiodic information, the condition of quitting network is met. When the time information is periodic information and the time information is greater than first preset duration, the condition of quitting network is met. The first preset duration can be understood as the time when the customer premise equipment 10 fails to search the second network system according to the time information.

In some embodiments, the processor 22 may also be configured to send an adjustment request to the base station when the periodic information is greater than the second preset duration and less than the first preset duration. The adjustment request may be used to instruct the base station to adjust the time information in the measurement instruction.

The processor 22 may also be configured to control the millimeter wave antenna to periodic search the antenna signal of according to the time information transmitted by the base station. If the periodic information is larger than the second preset time, the antenna signal can be searched according to the periodic time information, but the search efficiency may be low and the search power consumption of the customer premise equipment 10 may be large. The customer premise equipment 10 can send an adjustment request to the base station, and the base station can adjust the time information in the measurement instruction according to the received adjustment request. The adjustment request can also carry the target time information. The base station can adjust the measurement instruction according to the target time information carried in the adjustment request to shorten the periodic time information, so as to improve the search efficiency of the second network system of the customer premise equipment 10 and reduce the power consumption of the customer premise equipment 10.

In some embodiments, the measurement instruction also includes a network access threshold value for accessing the second network system. The processor 22 may be further configured to take a block corresponding to the network information greater than or equal to the network access threshold value as the target block when any of the pieces of network information is greater than or equal to the network access threshold value.

The network access threshold value meets a request of the standard value for the customer premise equipment 10 to access the second network system. It should be noticed that the standard value can be the lowest standard value, the highest standard value, or any of the lowest standard value and the highest standard value.

Specifically, in the process of the millimeter wave antenna rotating, each time the millimeter wave antenna rotates, the piece of network information of antenna signal may be measured once under the current block, and an acquired piece of network information is compared with the network access threshold value. If the piece of network information is greater than or equal to the network access threshold value, the current block is taken as the target block, and then an access request may be sent to the base station under the target block. The access request may be used to instruct the base station to issue an access command of the second network system to the customer premise equipment 10, so that the customer premise equipment 10 initiates the network access according to the access command, and then resides in the second network system.

In the embodiment, the processor 22 may be configured to immediately stop controlling the millimeter wave antenna to rotate when the acquired piece of network information meets the network access conditions that the acquired piece of network information is greater than or equal to the network access threshold value, so as to stop the millimeter wave antenna from searching for antenna signals. Thus, the efficiency of the customer premise equipment 10 in searching for antenna signals can be improved, and then the speed of the customer premise equipment 10 accessing the second network system can be improved.

In some embodiments, the processor 22 may be further configured to access the second network system when the acquired a piece of network information under each block is greater than or equal to the network access threshold value, obtain a plurality of pieces of beam information of the antenna signals received by the millimeter wave antenna, quit the second network system, and determine the target block according to at least one piece of beam information under at least one block.

In each block, the customer premise equipment 10 can correspondingly obtain the piece of network information of the second network system measured by the millimeter wave antenna, and compare the acquired piece of network information with the access threshold value. When the network information is greater than the network access threshold value, the acquired piece of network information meets the network access conditions and can access to the second network system under the block corresponding to the acquired piece of network information. When the customer premise equipment 10 accesses to the second network system, the customer premise equipment 10 can obtain a plurality of pieces of beam information of the antenna signals received by the millimeter wave antenna from the base station. The beam information can refer to the gain information of the received antenna signal of the millimeter wave antenna. When obtaining the plurality of pieces of beam information, the customer premise equipment 10 can exit the second network system. That is to say, the processor 22 can be configured to perform the operation of accessing the second network system, acquiring the plurality of pieces of beam information and exiting the second network system when the network information is greater than or equal to the network access threshold value under each block.

During the rotation of the millimeter wave antenna, the processor 22 may be configured to obtain at least one piece of beam information received by the millimeter wave antenna under at least one block. In some embodiments, the processor 22 may be configured to correspondingly acquire a plurality of pieces of beam information. The number of the pieces of beam information is represented by "m" which may be greater than or equal to 1. The processor 22 may be configured to filter out the piece of beam information with the maximum value from the plurality of pieces of beam information and take the block corresponding to the piece of beam information with the maximum value as the target block. When the target block is determined, the processor 22 may be configured to control the millimeter wave antenna to rotate to the target block to enable the customer premise equipment 10 to access the second network system.

In the embodiment, in the process of controlling the rotation of the millimeter wave antenna, the processor 22 can access to the second network system under preset conditions, and obtain a plurality of pieces of beam information received by the millimeter wave antenna, and determine the target block according to the plurality of pieces of beam information, which can improve the communication quality of the customer premise equipment 10 accessing the second network system.

In some embodiments, the processor 22 may be further configured to transmit omni-directional network data to a base station. The network data may include a piece of network information of the antenna signal measured by the millimeter wave antenna under each block and carries an acquisition request, which may be used to instruct the base station to determine the target block based on the omni-directional network data.

The omni-directional network data may at least include the a plurality of pieces of network information under some blocks and the cell identification of NR cell corresponding to each block. Furthermore, the plurality of pieces of network information may also carry the information. In other words, the omni-directional network data can be the plurality of pieces of network information under all blocks, or the plurality of pieces of network information under some blocks filtered by the customer premise equipment 10 according to the threshold value. After receiving the omni-directional network data, the base station can obtain signal layout of the second network system in the whole space according to the omni-directional network data, and then determine the NR target cell that the customer premise equipment 10 is suitable for access, and match the target block according to the NR target cell. In some embodiments, the base station can determine the NR target cell based on the comprehensive consideration of loads and other information of each NR cell. The base station may send the determined target block to the customer premise equipment 10.

In the embodiment, the processor 22 can be configured to send the acquired omni-directional network data to the base station. The base station may determine the target block of the customer premise equipment 10 to access to the second network system according to the NR cell load and other information, which can reasonably allocate the access resources of the NR cell and improve the efficiency of the customer premise equipment 10 in subsequent access to the second network system.

In some embodiments, the processor 22 may be further configured to access to the second network system under the target block, obtain a piece of beam information of the current beam of the millimeter wave antenna connected with the base station based on the second network system, and control the millimeter wave antenna to rotate within a preset rotation range according to the piece of beam information to calibrate alignment direction between the millimeter wave antenna and the base station.

When the millimeter wave antenna is rotated to the target block, the processor 22 can access to the second network system under the target block. In some embodiments, the processor 22 may be configured to send an access request to the base station requesting access to the second network system when the millimeter wave antenna rotates to the target block. The base station may send an access command of the second network system to the customer premise equipment 10 according to the access request. The processor 22 may be configured to access to the second network system according to the access command.

The processor 22 may be configured to transmit and receive signals of the second network system when accessing to the second network system, and can obtain a piece of beam information of the current beam of the millimeter wave antenna connected with the base station. The piece of beam information may include at least the gain information of millimeter wave antenna in all directions.

The processor 22 may be configured to control millimeter wave antenna to rotate in a preset range based on the piece of beam information to fine tune the alignment direction of the millimeter wave antenna with the base station. In some embodiments, the processor 22 may be configured to obtain the gain information of the millimeter wave antenna in each direction. For example, the gain information in the direction $\beta$ is the largest. Under these circumstances, the customer premise equipment 10 can control the millimeter wave antenna to rotate so that the plane of the millimeter wave antenna is perpendicular to the direction $\beta$, and then the millimeter wave antenna can be aligned with the base station, so as to achieve the gain maximization of millimeter wave antenna.

In the embodiment, by setting a rotatable millimeter wave antenna, the rotation of the millimeter wave antenna can be controlled according to the signal quality and other information received by the millimeter wave antenna, the radiation direction of the millimeter wave antenna, and accurately align with the antenna beam of the base station can be automatically adjusted, which can improve the alignment efficiency and communication quality.

In some embodiments, the processor 22 may be configured to obtain the signal quality information of the antenna signal received by the millimeter wave antenna. When the signal quality information is lower than the preset quality threshold value and lasts for a preset length of time, the customer premise equipment 10 again controls the millimeter wave antenna to rotate according to a calibration rotation strategy.

Specifically, when the customer premise equipment 10 access to the second network system, the processor 22 may be configured to obtain the signal quality information of the antenna signal received by the millimeter wave antenna. The signal quality information can include received signal strength indication, signal-to-noise ratio, reference signal receiving power, etc. After the customer premise equipment 10 accessing to the second network system, when the millimeter wave antenna receives the beam of the base station connected with the millimeter wave antenna, the signal quality of the antenna signal received by the millimeter wave antenna will change with the current environment of the customer premise equipment 10. When the signal quality information is lower than the preset quality threshold and lasts for a preset duration, the customer premise equipment 10 may quit the network. Under these circumstances, the processor 22 can be configured to control the millimeter wave antenna to rotate according to the calibration rotation strategy to adjust the direction of the millimeter wave antenna to aim at the base station, thereby improving the communication quality of the customer premise equipment 10.

It should be noticed that the preset quality threshold value and the preset duration can be set according to antenna performance parameters of the millimeter wave antenna, the frequency band of the second network system received and transmitted by the millimeter wave antenna and the like. In the embodiment of the present disclosure, the preset quality threshold value and the preset duration.

In some embodiments, the calibration rotation strategy may include automatic calibration based on the millimeter wave antenna.

Specifically, the processor 22 may be configured to obtain an identification request sent by the base station from the radio frequency circuit. The identification request may be used to instruct the customer premise equipment 10 to obtain the equipment calibration type. The processor 22 may be configured to report an equipment calibration type result to the base station according to the identification request. The processor 22 may be configured to automatically calibrate the radiation direction of the millimeter wave antenna according to the calibration instruction sent by the base station.

The equipment calibration type may include automatic calibration equipment and passive calibration equipment. The automatic calibration equipment can be understood that the customer premise equipment 10 supports automatic calibration of the millimeter wave antenna radiation direction, and the passive calibration equipment can be understood that the customer premise equipment 10 does not support automatic calibration of millimeter wave antenna radiation direction, but needs to use other auxiliary devices to automatically calibrate the millimeter wave antenna radiation direction.

The calibration instruction may be determined by the base station according to the equipment calibration type result reported by the customer premise equipment 10. When the equipment calibration type result is automatic calibration equipment, the base station will generate corresponding calibration instructions and send generated calibration instructions to the customer premise equipment 10.

In some embodiments, the calibration rotation strategy may include controlling the millimeter wave antenna to rotate again according to the piece of network information of the recorded millimeter wave antenna corresponding to each block. In some embodiments, the processor 22 may be configured to determine a plurality of access blocks conforming to the access to the second network system based on the piece of network information measured under each block, determine rotation priority according to the piece of network information corresponding to each access block, and control the millimeter wave antenna to rotate according to the rotation priority. For example, the plurality of access blocks may be recorded as: first access block, second access block, third block, . . . N-th access block. A corresponding rotation priority may be from high to low. The customer premise equipment 10 can control the millimeter wave antenna to rotate according to the rotation sequence of the first access block, the second access block, . . . the N-th access block. For each rotation, whether the received signal quality information is lower than the preset quality threshold and lasts for a preset duration need to be judged.

Furthermore, the processor 22 may be configured to rotate the millimeter wave antenna to the target access block according to the piece of network information corresponding to each access block to calibrate the direction of the millimeter wave antenna to aim at the base station.

An antenna control method is provided according to some embodiments of the present disclosure, which may be applied to the customer premise equipment in any of the above embodiments. The customer premise equipment may include a millimeter wave antenna for receiving and transmitting antenna signals in the millimeter wave band, a RF circuit connected with the millimeter wave antenna, which is configured to control the millimeter wave antenna to receive and receive the antenna signals, and measure a piece of network information of each antenna signal and a driver module connected with the millimeter wave antenna, which may be configured to drive the millimeter wave antenna to rotate.

Figure 7:
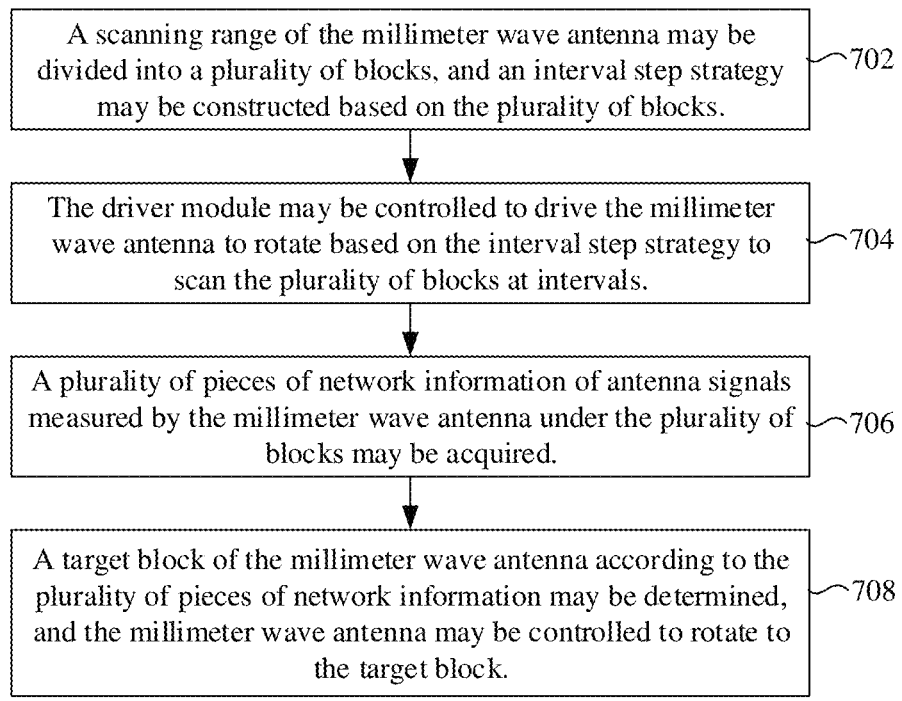
FIG. 7 is a flow chart of an antenna control method according to some embodiments of the present disclosure.

Referring to FIG. 7, in some embodiments, the antenna control method may include the following operations illustrated at blocks 702 to 708.

At block 702, a scanning range of the millimeter wave antenna may be divided into a plurality of blocks, and an interval step strategy may be constructed based on the plurality of blocks.

In some embodiments, the scanning range of the millimeter wave antenna rotation may be 360 degrees omni-directional in a horizontal plane. That is, the driving mechanism 252 can drive the millimeter wave antenna to realize 360 degrees omni-directional coverage rotation. The customer premise equipment can divide the scanning range of millimeter wave antenna rotation into the plurality of blocks. The scanning ranges of the plurality of blocks may be the same. That is, included angles of the scanning range corresponding to the plurality of blocks may be also equal. An included angle of the scanning range corresponding each block can be 180 degrees, 120 degrees, 90 degrees, 75 degrees, 60 degrees, 45 degrees, 30 degrees, 15 degrees, etc.

According to the included angle of the scanning range corresponding to each block, the customer premise equipment can obtain the number of blocks. The number may be marked as a. The formulation of calculating the number may be a=360/A. A refers to the included angle of the scanning range corresponding to each block. For example, when the included angle of the scanning range is 180 degrees, the corresponding number may be 2. That is, the millimeter wave antenna can rotate twice to achieve omni-directional coverage. When the included angle of the scanning range is 120 degrees, the corresponding number may be 3. That is, the millimeter wave antenna can rotate 3 times to achieve omni-directional coverage. When the scanning range is 90 degrees, the corresponding number may be 4. That is, the millimeter wave antenna can rotate 4 times to achieve omnidirectional coverage. When the scanning range is 75 degrees, the corresponding number may be 5. That is, the millimeter wave antenna can rotate 5 times to achieve omnidirectional coverage.

It should be noticed that the specific value of the included angle of the scanning range corresponding to each block may not further limited. Specifically, the included angle of the scanning range corresponding to each block may be smaller than a preset angle. The preset angle can be 120 degrees. According to the omni-directional coverage strategy, the number of blocks may be greater than 3.

In some embodiments, the scanning range of the millimeter wave antenna rotation may be $\Phi$. $\Phi$ may be less than 360 degrees. That is, the driving mechanism 252 can drive the millimeter wave antenna to rotate to scan a part of the azimuth to realize the partial coverage rotation. Specifically, the customer premise equipment may obtain the number of blocks according to a corresponding scanning range of the millimeter wave antenna rotation. The scanning ranges corresponding to a plurality of block may be the same, that is, included angles of the scanning range corresponding to a plurality of blocks may be also equal. According to an included angle of the scanning range corresponding to each block, the number of the plurality of blocks may be obtained. The number may be marked as b. The formulation of calculating b may be b=360/A. A refers to the included angle of the scanning range corresponding to each block.

Furthermore, the driving mechanism 252 can drive the millimeter wave antenna to realize 360 degrees omni-directional coverage rotation or partial coverage rotation according to the rotation step. The rotation step may be marked as 'n'. The rotation step may be less than or equal to the scanning range corresponding to each block. For example, when the scanning range corresponding to each block is 30 degrees, the corresponding rotation step may be 5 degrees, 10 degrees, 15 degrees, 30 degrees, etc. In some embodiments, the scanning range corresponding to each block and the rotation step n can be set to be equal.

It should be noticed that the rotation step n may be determined by a scanning coverage range and spectrum characteristics of the millimeter wave antenna. The wider the scanning coverage range of the millimeter wave antenna is, the larger the rotation step is.

In one of embodiment, the interval step strategy can be understood as that when stepping from the current block to the next block in the rotation process, the millimeter wave antenna may not sequentially step in a clockwise or counterclockwise direction but take an interval step rotation. Interval step rotation can be understood as step rotation from the previous block to the current block separated from the previous block by one or more blocks, or step rotation from the current block to the next block separated from the current block by one or more blocks.

In some embodiments, constructing the interval step strategy based on the plurality of blocks may specifically include: obtaining a scanning range of each block; determining a step value according to the scanning range of each block; and determining the interval step strategy according to the step value.

It is supposed that the interval step strategy may be to control the driving mechanism to drive the millimeter wave antenna to rotate in an order of the first block, the second block and the third block, . . . the a-th block. The second block may be not next to the first block in a clockwise or anticlockwise direction, but separated from the first block by one or more blocks. That is, there may be an interval between the first block and the second block. The interval between the first block and the second block may be the step value. If the current block is block I, the previous block can be the I−1 block, and the next block can be the I+1 block.

In some embodiments, when the scanning range corresponding to each block is 75 degrees, the number of blocks may be 5, and each block can be identified in a clockwise or counterclockwise direction, for example, blocks 1, 2, 3, 4 and 5 can be identified. Furthermore, the step value can be determined according to the scanning range corresponding to each block. The step value can be understood as a scanning range between the current block and the previous block. The step value may include a scanning range corresponding to at least one block. Referring to FIGS. 4A and 4B, for example, when the step value is the scanning range corresponding to one block, the interval step strategy determined according to the step value may be to perform the step rotation in the order of block 1, block 3, block 5, block 2 and block 4, or in the order of block 1, block 4, block 2, block 5, block 3.

Referring to FIG. 5A and FIG. 5b, in some embodiments, when the scanning range corresponding to each block is of 90 degrees, the corresponding number of blocks may be 4, and each block can be identified in a clockwise or counterclockwise direction, for example, blocks 1, 2, 3 and 4 can be identified. When the step value is the scanning range corresponding to one block, the interval step strategy determined according to the step value may be to perform the step rotation in the order of block 1, block 3, block 2 and block 4, or in the order of block 1, block 3, block 4 and block 2.

Referring to FIG. 6, in some embodiments, when the scanning range corresponding to each block is 45 degrees and the corresponding of blocks may be 8, each block can be identified in a clockwise or counterclockwise direction, for example, blocks 1, 2, 3, 4, 5, 6, 7 and 8 can be identified. The step value can be determined according to the scanning range corresponding to each block. The step value can be two, one may be the scanning range corresponding to two blocks, and the other may be the scanning range corresponding to three blocks. The interval step strategy determined according to the step value may be to perform the step rotation in the order of block 1, block 5, block 8, block 4, block 7, block 3, block 6 and block 2.

It should be noticed that block 1 can be used as the starting block. The initial position of block 1 is not limited, and can be any position of 360 degrees circumference. According to the omni-directional coverage strategy, the 360 degrees omni-directional direction can be divided into a plurality of blocks. The number of the blocks may be marked as a. When the way of stepping from the (a−2)-th block to the (a−1)-th block or the a-th block is only a sequential step rotation, the millimeter wave antenna rotation can be controlled according to the sequential step rotation.

Furthermore, the step value can be set according to the scanning range corresponding to each block and the number of blocks. When the starting block moves to the next block relative to the starting block, the step value between the starting block and the next block can be the scanning range corresponding to (a−1)/2−1 blocks, or the scanning range corresponding to a/2−1 blocks. For example, when the interval step strategy is to control the millimeter wave antenna to rotate in the order of block 1, block 5, block 8, block 4, block 7, block 3, block 6 and block 2, the block 1 is the starting block and block 5 is the next block relative to the starting block.

At block 704, the driver module may be controlled to drive the millimeter wave antenna to rotate based on the interval step strategy to scan the plurality of blocks at intervals.

In some embodiments, the customer premise equipment may control the driver module to drive the millimeter wave antenna to rotate to scan the plurality of blocks at intervals according to the interval step strategy constructed. For example, when the interval step strategy can be step rotating in the order of block 1, block 3, block 5, block 2 and block 4, the customer premise equipment can drive the millimeter wave antenna to rotate in the order of block 1, block 3, block 5, block 2 and block 4. In the process of controlling the millimeter wave antenna to rotate based on the interval step strategy, when the millimeter wave antenna steps from block 1 to block 3, the block 2 can be skipped and the millimeter wave antenna to be directly controlled to scan the scanning range of block 3.

At block 706, a plurality of pieces of network information of antenna signals measured by the millimeter wave antenna under the plurality of blocks may be acquired.

In some embodiments, in the process of the millimeter wave antenna rotating, the RF circuit can correspondingly measure a piece of network information of the antenna signal received by the millimeter wave antenna under each block. The customer premise equipment can obtain the piece of network information of the antenna signal received by the millimeter wave antenna under each block from the RF circuit.

Specifically, the piece of network information of the antenna signal measured under each block can be understood as the piece of pieces of network information of the antenna signal measured under any rotation angle in each block, or the average valued of the plurality of pieces of network information of the antenna signals measured under a plurality of rotation angles in each block, or the maximum value of the plurality of pieces of network information of antenna signals measured under a plurality of rotation angles in each block.

Alternatively, the piece of network information of the antenna signal measured under the current block can understand as the piece of network information measured at the rotation angle between the critical points of the current block and the next block. For example, the piece of network information measured under the i-th block can be understood as the piece of network information measured at the rotation angle between the critical points of the i-th block and the (i+1)-th block.

The rotation angle can be understood as the scanning angle of the millimeter wave antenna from the initial position to the current position. In some embodiments, the absolute zero point can be set by the magnetic coding chip, and the absolute zero point can be taken as the initial position. The magnetic coding chip can record the rotation angle between the current position and the initial position of the millimeter wave antenna. Certainly, in other embodiments, an angle measurement method can also be used to record the rotation angle between the current position and the last position of the millimeter wave antenna.

At block 708, a target block of the millimeter wave antenna according to the plurality of pieces of network information may be determined, and the millimeter wave antenna may be controlled to rotate to the target block.

In some embodiments, the customer premise equipment may determine the target block of the millimeter wave antenna based on the plurality of pieces of network information, and may control the millimeter wave antenna to rotate to the target block. The customer premise equipment can control the millimeter wave antenna to rotate within 360 degrees of the same plane according to the interval step strategy. Thus, the omni-directional NR cell can be searched, measure the plurality of pieces of network information of the millimeter wave antenna corresponding to different blocks, record the plurality of pieces network information, and then determine a target network information from the plurality of pieces of network information. The block corresponding to the target network information may be the target block.

In some embodiments, a reference signal parameter may be selected from at least one signal parameter of the piece of network information. A reference signal parameter with a maximum value may be selected from the plurality of pieces of network information, and the piece of network information with the reference signal parameter with a maximum value may be taken as the target network information.

In some embodiments, the network information a reference signal receiving power may be taken as the piece of network information. In other words, the customer premise equipment can obtain a plurality of reference signal receiving powers of the millimeter wave antenna under the plurality of blocks, obtain a maximum value of reference signal receiving power from the plurality of reference signal receiving powers, and take the reference signal receiving power with maximum value as the target network information. The block corresponding to the target network information may be the target block. After obtaining the target block, the millimeter wave antenna can be controlled to rotate to the target block, so that the millimeter wave antenna can accurately aim at the base station.

In the embodiment, the customer premise equipment can control the driving mechanism to drive the millimeter wave antenna to rotate based on the interval step strategy, so as to measure the plurality of pieces of network information of the antenna signals under different blocks, and control the millimeter wave antenna to rotate rapidly to the target block, that is, automatically adjust the radiation direction of the millimeter wave antenna. Thus, the millimeter wave antenna can accurately aim at the antenna beam of the base station, which can improve the alignment efficiency and communication quality. Moreover, the number of millimeter wave antennas can be reduced. Only one millimeter wave antenna can achieve a wide range of coverage, which can reduce the cost. Besides, the customer premise equipment can also control the driving mechanism to drive the millimeter wave antenna to rotate based on the interval step strategy. A coherence between the two adjacent step rotations may be the minimum and the signal interference may be reduced. The omni-directional NR cell search can be completed quickly.

Figure 8:
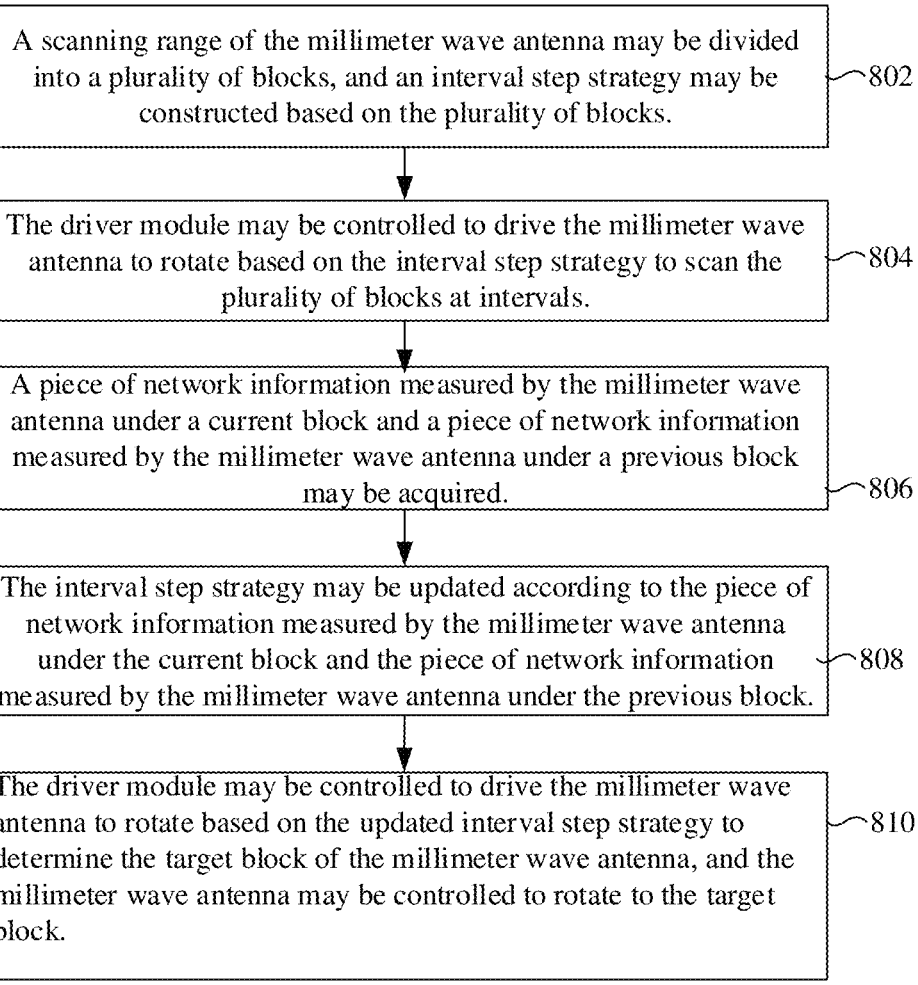
FIG. 8 is a flow chart of an antenna control method according to some other embodiments of the present disclosure.

Referring to FIG. 8, in some other embodiments, the antenna control method may include the following operations illustrate at blocks 802 to 810.

At block 802, a scanning range of the millimeter wave antenna may be divided into a plurality of blocks, and an interval step strategy may be constructed based on the plurality of blocks.

At block 804, the driver module may be controlled to drive the millimeter wave antenna to rotate based on the interval step strategy to scan the plurality of blocks at intervals.

At block 806, a piece of network information measured by the millimeter wave antenna under a current block and a piece of network information measured by the millimeter wave antenna under a previous block may be acquired.

For example, in some embodiments, a scanning range of each block may be 90 degrees. The corresponding number of the plurality of blocks may be 4, and each block can be identified in a clockwise or counterclockwise direction, for example, 1, 2, 3 and 4. A corresponding interval step strategy may be to control the millimeter wave antenna to rotate in the order of block 1, block 3, block 2, and block 4.

At block 808, the interval step strategy may be updated according to the piece of network information measured by the millimeter wave antenna under the current block and the piece of network information measured by the millimeter wave antenna under the previous block.

In the progress of customer premise equipment controlling the millimeter wave antenna to rotate at intervals in the order of block 1, block 3, block 2, and block 4, when stepping from block 1 to block 3, the two pieces of network information corresponding to block 1 and block 3 can be obtained, and the interval step strategy can be updated according to the two pieces of network information corresponding to block 1 and block 3.

For example, if the reference signal parameter of the piece of network information under block 3 is greater than that of the piece of network information under block 1, the target block may be determined among block 2, block 3 and block 4. If the reference signal parameter under block 1 is greater than that under block 3, the target block can be determined among block 1, block 2 and block 4.

At block 810, the driver module may be controlled to drive the millimeter wave antenna to rotate based on the updated interval step strategy to determine the target block of the millimeter wave antenna, and the millimeter wave antenna may be controlled to rotate to the target block.

For example, when the target block needs to be determined among block 2, block 3 and block 4, the interval step strategy can be changed to interval rotation in the order of block 1, block 3, block 4 and block 2. If the reference signal parameter under block 4 is greater than that of block 3, block 4 will be taken as the target block. Under these circumstances, the customer premise equipment will no longer control the millimeter wave antenna to rotate. If the reference signal parameter under block 3 is greater than that of block 4, the millimeter wave antenna may be controlled to rotate in sequence according to block 3 and block 2, and the interval step strategy may be changed to interval rotation in the order of block 1, block 3 and block 2. If the reference signal parameter under block 3 is greater than that under block 2, block 3 may be taken as the target block, and the interval step strategy is changed to interval rotation in the order of block 1 and block 3.

The customer premise equipment can control the millimeter wave antenna to rotate according to the updated interval step strategy. The target block can be obtained after searching some blocks, which may improve the speed of determining the target block and the efficiency of network search.

In some embodiments, the millimeter wave antenna may include a plurality of radiation units. The RF circuit can control the radiation beam angle of each radiation unit according to the amplitude and phase of the antenna signal received by each radiation unit. Thus, the plurality of radiation units may receive a plurality antenna signals to synthesize a beam with a certain direction angle.

In some embodiments, the plurality of radiation units can be regarded as a whole. The RF circuit can obtain the piece of network information of the antenna signal received by each radiation unit, and then may comprehensively figure out the plurality of pieces of network information of the antenna signals received by the plurality of radiation units in a current rotation angle. A figured out network information can be understood as the average value or the maximum value of the plurality of pieces of network information of antenna signals received by the plurality of the radiation units. It should be noticed that in the embodiment of the present disclosure, the meaning of the figured out network information is not further limited.

Figure 9:
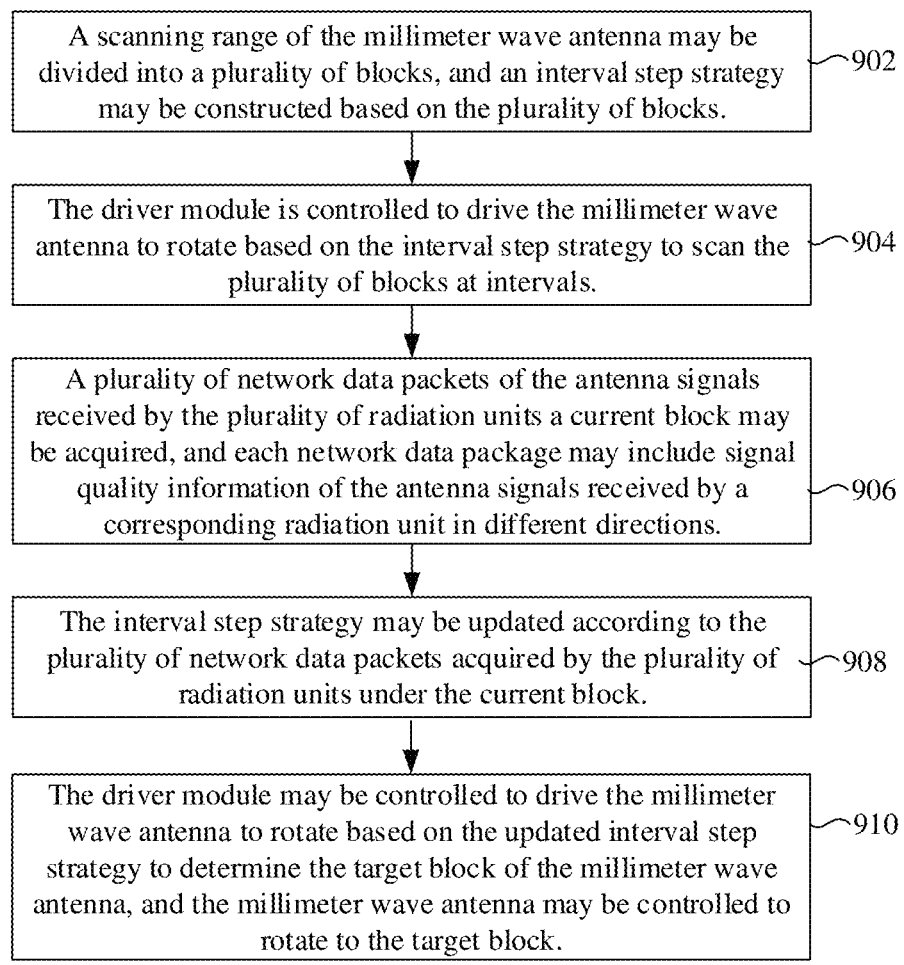
FIG. 9 is a flow chart of an antenna control method according to some other embodiments of the present disclosure.

Referring to FIG. 9, in some other embodiments, the antenna control method may include the following operations illustrate at blocks 902-910.

At block 902, a scanning range of the millimeter wave antenna may be divided into a plurality of blocks, and an interval step strategy may be constructed based on the plurality of blocks.

At block 904, the driver module is controlled to drive the millimeter wave antenna to rotate based on the interval step strategy to scan the plurality of blocks at intervals.

At block 906, a plurality of network data packets of the antenna signals received by the plurality of radiation units under a current block may be acquired, and each network data package may include signal quality information of the antenna signals received by a corresponding radiation unit in different directions.

In some embodiments, the millimeter wave antenna may include four radiation units. The four radiation units can be arranged in one-dimensional linear array or in 2×2 two-dimensional array in a same plane. Position information of the four radiation units can be represented by $P_1$ (x, y), $P_2$ (x, y), $P_3$ (x, y), and $P_4$ (x, y). Only one radiation unit of the four radiation units may be working at the same time. The RF circuit can obtain the signal quality information of the antenna signal received by any work radiation unit in different directions.

In some embodiments, the customer premise equipment can obtain the network data packet of each radiation unit, and the network data packets of the four radiation units can be represented by $Q_{P1}$, $Q_{P2}$, $Q_{P3}$ and $Q_{P4}$ respectively. Besides, each network data packet can include spatial position information of the corresponding radiation unit and the beam directivity information of each radiation unit in each direction, that is, the signal quality information of the millimeter wave antenna received by the corresponding radiation unit in all directions.

At block 908, the interval step strategy may be updated according to the plurality of network data packets acquired by the plurality of radiation units under the current block.

At block 910, the driver module may be controlled to drive the millimeter wave antenna to rotate based on the updated interval step strategy to determine the target block of the millimeter wave antenna, and the millimeter wave antenna may be controlled to rotate to the target block.

Specifically, the customer premise equipment can screen out the maximum value $Q_{max}$ among the four network packets $Q_{P1}$, $Q_{P2}$, $Q_{P3}$ and $Q_{P4}$, and a target radiation unit can be determined by obtaining the maximum value $Q_{max}$. The customer premise equipment can obtain the spatial position information of the target radiation unit and the signal quality information of the beam in all directions. At the same time, the azimuth angle corresponding to the beam with the maximum signal quality may be determined, which may be taken as the target tracking azimuth angle. The customer premise equipment can obtain the next block of the millimeter wave antenna according to the target tracking azimuth angle, and then update the interval step strategy.

According to updated interval step strategy, the customer premise equipment can control the driver module to drive the millimeter wave antenna to rotate to determine the target block of the millimeter wave antenna, and control the millimeter wave antenna to rotate to the target block. The customer premise equipment can control the millimeter wave antenna to rotate according to the updated interval step strategy. The target block can be obtained after searching some blocks, which may improve the speed of determining the target block and the efficiency of network search.

In some embodiments, the customer premise equipment can work in a non-independent networking mode or in an independent networking mode. The third generation partnership project (3GPP) defines two schemes for 5G new radio (NR) networking, namely stand alone (SA) and non-stand alone (NSA). When the customer premise equipment needs 5G communication, the customer premise equipment can access the cell with the ability to support non-independent networking or independent networking, and access the air port of NR according to different networking modes, so as to enjoy 5G service.

Figure 10:
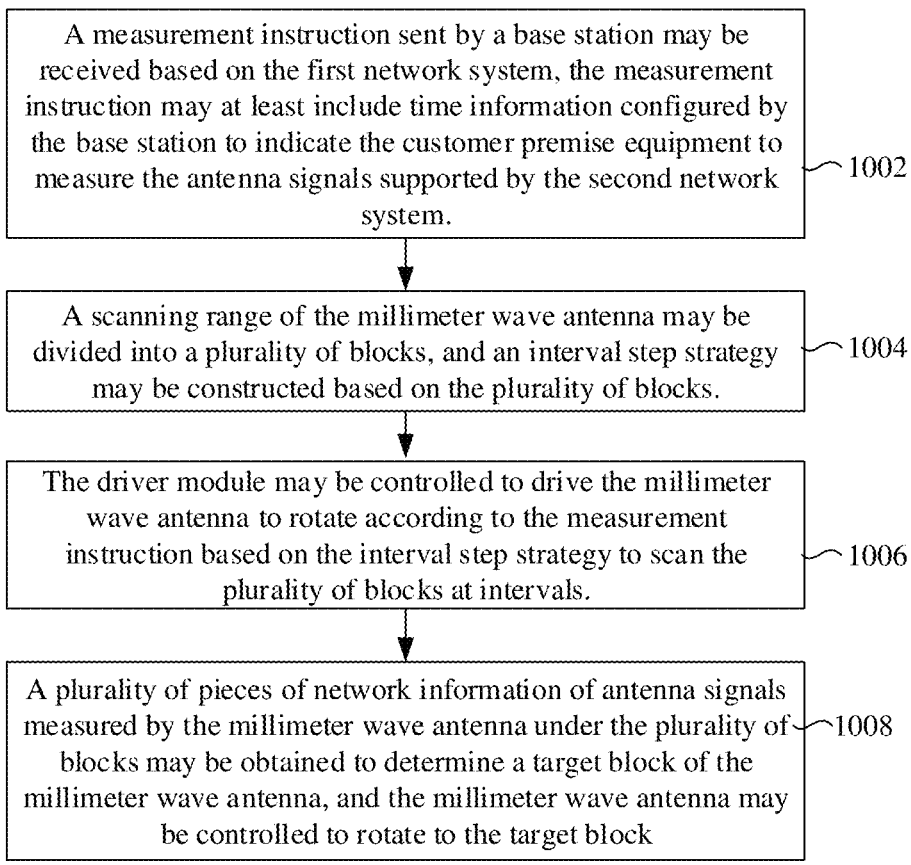
FIG. 10 is a flow chart of an antenna control method according to some other embodiments of the present disclosure.

Referring to FIG. 10, in some embodiments, when the customer premise equipment works in a non-independent networking mode, the antenna control method of the customer premise equipment may include the following operations illustrate at blocks 1002-1010.

At block 1002, a measurement instruction sent by a base station may be received based on the first network system, the measurement instruction may at least include time information configured by the base station to indicate the customer premise equipment to measure the antenna signals supported by the second network system.

Specifically, the customer premise equipment can proactively initiate the network access process of accessing the first network system and reside in the first network system. When successfully residing in the first network system, the customer premise equipment can receive the measurement instructions sent by the base station through the first network system. The measurement instructions shall at least include the time information configured by base station and the network access threshold value of the customer premise equipment residing the second network system. The time information may be used to instruct the customer premise equipment to measure the time of the second network system.

The first network system and the second network system may correspond to different frequency band range. For example, the first network system may be 4G network, and a corresponding network system may be LTE system. The second network system may be 5G network, and the corresponding network system may be 5G NR system.

The measurement instruments may be configured by the base station. The base station can set different time information according to the network density of NR system. In some embodiments, the time information can be 1 second, 5 seconds, 10 seconds, etc. For example, when the base station determines that the networks of NR cell around LTE cell where the customer premise equipment is located are densely distributed, and the NR system may have better coverage of the area where the customer premise equipment is located, the base station can control the time information of the second network system measured by the customer premise equipment to be longer. Thus, the power consumption of the customer front end can be reduced. When the base station determines the networks of the NR cell around the LTE cell where the customer is located are sparsely distributed, the base station can control the time information of the second network system measured by the customer premise equipment to be shorter, so as to ensure that the customer premise equipment can detect whether there is coverage of the second network system in time.

Alternatively, the first network system (LTE system) supports the NSA function, that is, supports the joint networking with the second network system (NR system) when the network where the customer premise equipment resides may be the first network system (4G network) and the second network system can be 5G network.

At block 1004, a scanning range of the millimeter wave antenna may be divided into a plurality of blocks, and an interval step strategy may be constructed based on the plurality of blocks.

At block 1006, the driver module may be controlled to drive the millimeter wave antenna to rotate according to the measurement instruction based on the interval step strategy to scan the plurality of blocks at intervals.

In some embodiments, when the customer premise equipment controls the millimeter wave antenna to rotate according to the measurement instructions and correspondingly obtains the piece of network information of the antenna signal measured by the millimeter wave antenna under each block, the customer premise equipment can control the millimeter wave antenna to rotate according to the time information in the measurement instruction to search for NR cells, and can measure the piece of network information of the antenna signal under each block.

The customer premise equipment may measure the antenna signal periodically according to the measurement instructions configured by the base station. Thus, disadvantages of real-time and continuous measurement of the antenna signal to increase the customer premise equipment power consumption can be avoided.

In some embodiments, when the time information received by the customer premise equipment meets the condition of quitting the network, the customer premise equipment can quit the first network system and re-reside in the first network system to receive the measurement instructions sent by the base station again. Specifically, the time information can be periodic information and a periodic information. When the time information is a periodic information, the condition of quitting the network may be met. When the time information is periodic information and the time information is greater than the first preset duration, the condition of quitting network may be met. The preset duration can be understood as the time when the customer premise equipment fails to search the second network system according to the time information.

In some embodiments, when the periodic information is larger than the second preset duration and less than the first preset duration, an adjustment request may be sent to the base station. The adjustment request may be used to instruct the base station to adjust the time information in the measurement instruction. Specifically, the customer premise equipment can control the millimeter wave antenna to periodically search antenna signal according to the time information sent by the base station. If the periodic information is larger than the second preset time, the antenna signal can be searched according to the periodic information, but the search efficiency may be low and the search power consumption of the customer premise equipment may be large. The customer premise equipment can send adjustment request to the base station, and the base station can adjust the time information in the measurement instruction according to the received adjustment request. The adjustment request may carry target time information. The base station can adjust the measurement instruction according to the target time information to shorten the periodic information. Thus, the search efficiency of the customer premise equipment in the second network system can be improved and the power consumption of the customer premise equipment can be reduced.

At block 1008, a plurality of pieces of network information of antenna signals measured by the millimeter wave antenna under the plurality of blocks may be obtained to determine a target block of the millimeter wave antenna, and the millimeter wave antenna may be controlled to rotate to the target block.

In some embodiments, the measurement instruction may also include an access threshold value for accessing the second network system. When any of the network information is greater than or equal to the network access threshold value, the block corresponding to the network information greater than or equal to the network access threshold value may be taken as the target block. The network access threshold value meets the request of the standard value for the customer premise equipment to access the second network system. It should be noticed that the standard value can be the lowest standard value, the highest standard value, or any of the lowest standard value and the highest standard value.

Specifically, in the progress of the millimeter wave antenna rotating, the piece of network information of the antenna signal can be measured once under the current block, and an obtained network information can be compared with the access threshold value. If the obtained network information is greater than or equal to the network access threshold value, the current block may be taken as the target block. Then an access request may be sent to the base station under the target block. The access request may be used to instruct the base station to issue an access command of accessing to the second network system to the customer premise equipment, so that the customer premise equipment initiates a network access according to the access command, and then resides in the second network system.

In the embodiment, when the obtained network information is greater than or equal to the access threshold value, the customer premise equipment may immediately stop controlling the millimeter wave antenna to rotate, so that the millimeter wave antenna may stop searching for antenna signal. Thus, the efficiency of the customer premise equipment in searching for antenna signal can be improved, and then the speed of the customer premise equipment accessing to the second network system may be increased.

In some embodiments, the operation that network information of the antenna signals measured by the millimeter wave antenna under the plurality of blocks may obtained to determine a target block can specifically include the following operations: omni-directional network data may be sent to the base station. The omni-directional network data may include the piece of network information of the antenna signal measured by the millimeter wave antenna under each block and may carry an acquisition request. The acquisition request may be used to instruct the base station to determine the target block according to the omni-directional network data.

The omni-directional network data may at least include a plurality of pieces of network information under some blocks and the cell identification of NR cell corresponding to the blocks. The plurality of pieces of network information may also carry the block information. In other words, the omni-directional network data can be the plurality of pieces of network information under all blocks in omni-direction, or the plurality of pieces of network information under some blocks filtered by the customer premise equipment according to the threshold. After receiving the omni-directional network data, the base station can understand the signal layout of the second network system in the whole space according to the omni-directional network data, and then determine the NR target cell suitable for the customer premise equipment to access, and match the target block according to the NR target cell. In some embodiments, the base station can determine the NR target cell based on comprehensive consideration of the load and other information of each NR cell. The base station can send a determined target block to the customer premise equipment.

In the embodiment, the customer premise equipment can send an acquired omni-directional network data to the base station, and the base station determines the target block of the customer premise equipment to access the second network system according to the NR cell load and other information. Thus, access resources of the NR cell may be reasonably allocated and the efficiency of the customer premise equipment access to the second network system may be improved.

Figure 11:
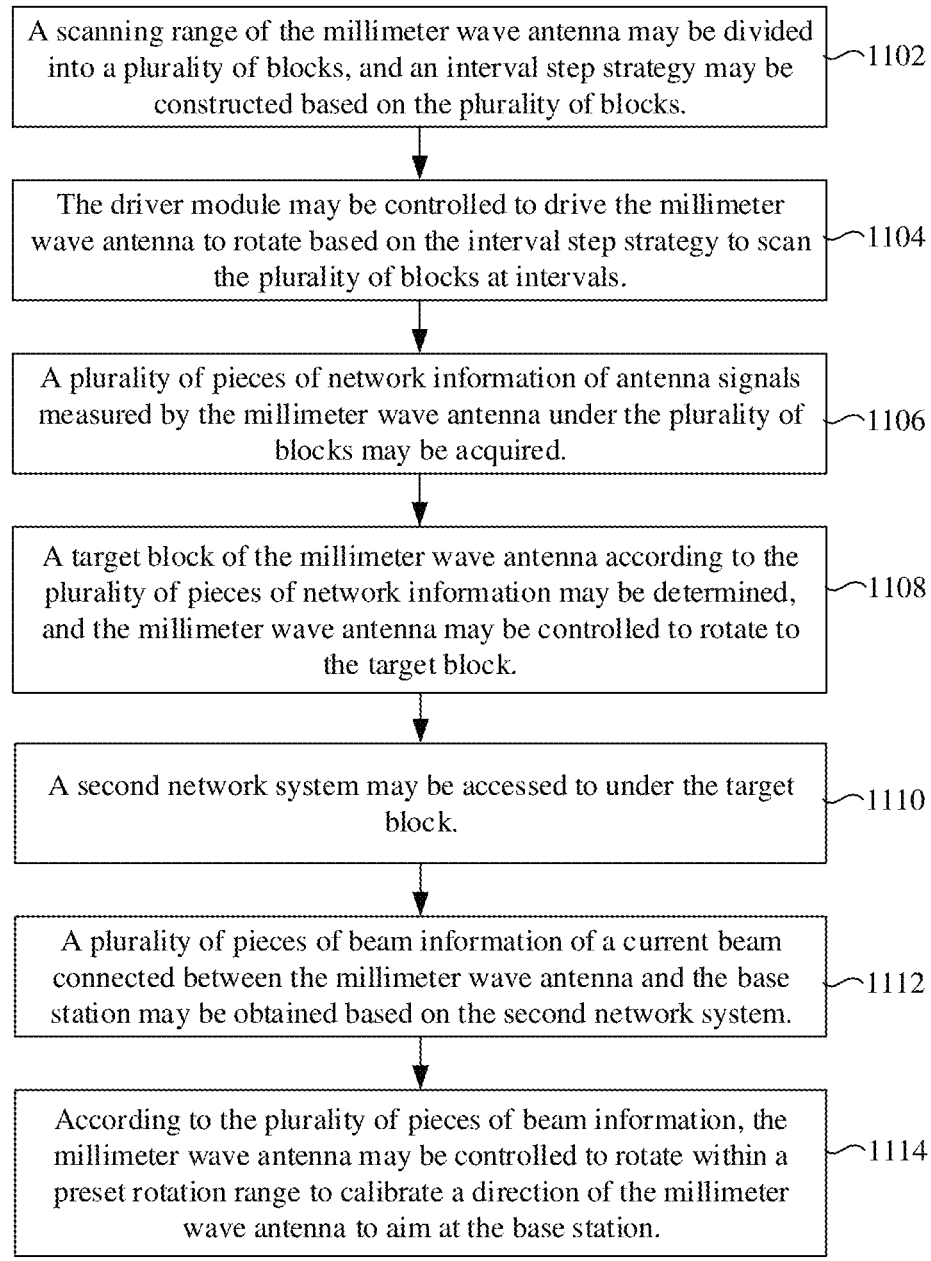
FIG. 11 is a flow chart of an antenna control method according to some other embodiments of the present disclosure.

As shown in FIG. 11, in some other embodiments, the antenna control method may include the following operations illustrated at blocks 1102-1114.

At block 1102, a scanning range of the millimeter wave antenna may be divided into a plurality of blocks, and an interval step strategy may be constructed based on the plurality of blocks.

At block 1104, the driver module may be controlled to drive the millimeter wave antenna to rotate based on the interval step strategy to scan the plurality of blocks at intervals.

At block 1106, a plurality of pieces of network information of antenna signals measured by the millimeter wave antenna under the plurality of blocks may be acquired.

At block 1108, a target block of the millimeter wave antenna according to the plurality of pieces of network information may be determined, and the millimeter wave antenna may be controlled to rotate to the target block.

Operations at blocks 1102-1108 corresponds to operations at blocks 702-708 in the above embodiment, and will not be described in detail.

At block 1110, a second network system may be accessed to under the target block.

At block 1112, a plurality of pieces of beam information of a current beam connected between the millimeter wave antenna and the base station may be obtained based on the second network system.

At block 1114, according to the plurality of pieces of beam information, the millimeter wave antenna may be controlled to rotate within a preset rotation range to calibrate a direction of the millimeter wave antenna to aim at the base station.

Specifically, the customer premise equipment can send an access request to the base station to access the second network system when the millimeter wave antenna rotates to the target block. The base station can send the network access command of accessing to the second network system to the customer premise equipment according to the access request. The customer premise equipment can access to the second network system according to the network access command.

When access to the second network system, the customer premise equipment may transmit and receive signals of the second network system through millimeter wave antenna, and can obtain the piece of beam information of the current beam connected between the millimeter wave antenna and base station. The piece of beam information may include at least the gain information of millimeter wave antenna in all directions.

According to the piece of beam information, the customer premise equipment may control the millimeter wave antenna to rotate within a preset range to fine tune the direction of the millimeter wave antenna to make the millimeter wave antenna aim at the base station. In some embodiments, the customer premise equipment can obtain the gain information of the millimeter wave antenna in all directions. For example, the gain information in the direction $\beta$ is the largest. Under these circumstances, the customer premise equipment can control the millimeter wave antenna to rotate so that a plane of the millimeter wave antenna may be perpendicular to the direction $\beta$, and then the millimeter wave antenna can be aligned with the base station to realize millimeter wave antenna gain maximization.

In the embodiment of the present disclosure, by setting a rotatable millimeter wave antenna, the millimeter wave antenna can be controlled to rotate in various practical application scenarios according to the signal quality and other information received by the millimeter wave antenna. The radiation direction of the millimeter wave antenna can be automatically adjusted to make the millimeter wave antenna accurately align with the antenna beam of the base station, which can improve the alignment efficiency and communication quality.

Figure 12:
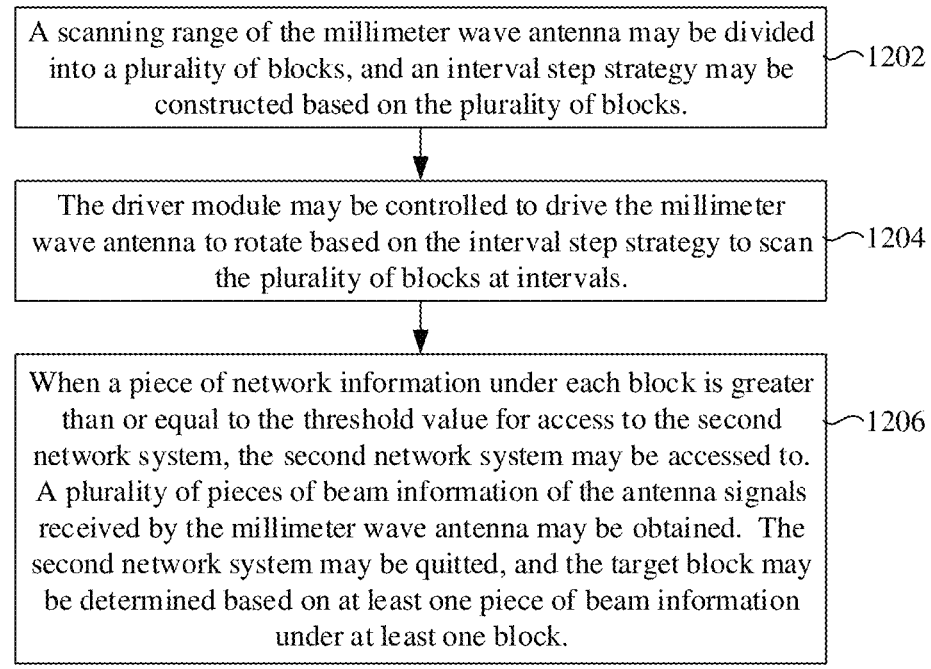
FIG. 12 is a flow chart of an antenna control method according to some other embodiments of the present disclosure.

Referring to FIG. 12, in some other embodiments, the antenna control method may include the following operations illustrated at blocks 1202-1206.

At block 1202, a scanning range of the millimeter wave antenna may be divided into a plurality of blocks, and an interval step strategy may be constructed based on the plurality of blocks.

At block 1204, the driver module may be controlled to drive the millimeter wave antenna to rotate based on the interval step strategy to scan the plurality of blocks at intervals.

At block 1206, when a piece of network information under each block is greater than or equal to the threshold value for access to the second network system, the second network system may be accessed to. A plurality of pieces of beam information of the antenna signals received by the millimeter wave antenna may be obtained. The second network system may be quitted, and the target block may be determined based on at least one piece of beam information under at least one block.

In some embodiments, the customer premise equipment can correspondingly obtain the network information of the second network system measured by the millimeter wave antenna in each block, and compare the obtained network information with the network access threshold value. When the network information is greater than the network access threshold value, the network information meets the network access conditions and the customer premise equipment can access to the second network system under the block corresponding to the network information.

When the customer premise equipment accesses to the second network system, the customer premise equipment can obtain a plurality of pieces of beam information of the antenna signals received by the millimeter wave antenna from the base station. The beam information can refer to the gain information of the antenna signal received by the millimeter wave antenna. When obtaining the plurality of pieces of beam information, the customer premise equipment can exit the second network system. In other words, when the piece of network information under each block is greater than or equal to the network access threshold value, the customer premise equipment can perform the operation of accessing to the second network system to obtain the plurality of pieces of beam information and exit the second network system.

In the process of millimeter wave antenna rotating, the customer premise equipment can obtain at least one piece of beam information received by the millimeter wave antenna in at least one block. For example, the customer premise equipment can correspondingly obtain a plurality of pieces of beam information. The number of the plurality of pieces of beam information may be m, which may be greater than or equal to 1, and the piece of beam information with the maximum value may be selected from the plurality of pieces of beam information, and the block corresponding to the piece of beam information with the maximum value may be taken as the target block.

In the embodiment, in the process of controlling the millimeter wave antenna to rotate, the customer premise equipment can access to the second network system under preset conditions, obtain the plurality of pieces of beam information received by the millimeter wave antenna, and determine the target block according to the plurality of pieces of beam information. Thus, the communication quality of the customer premise equipment access to the second network system can be improved.

Figure 13:
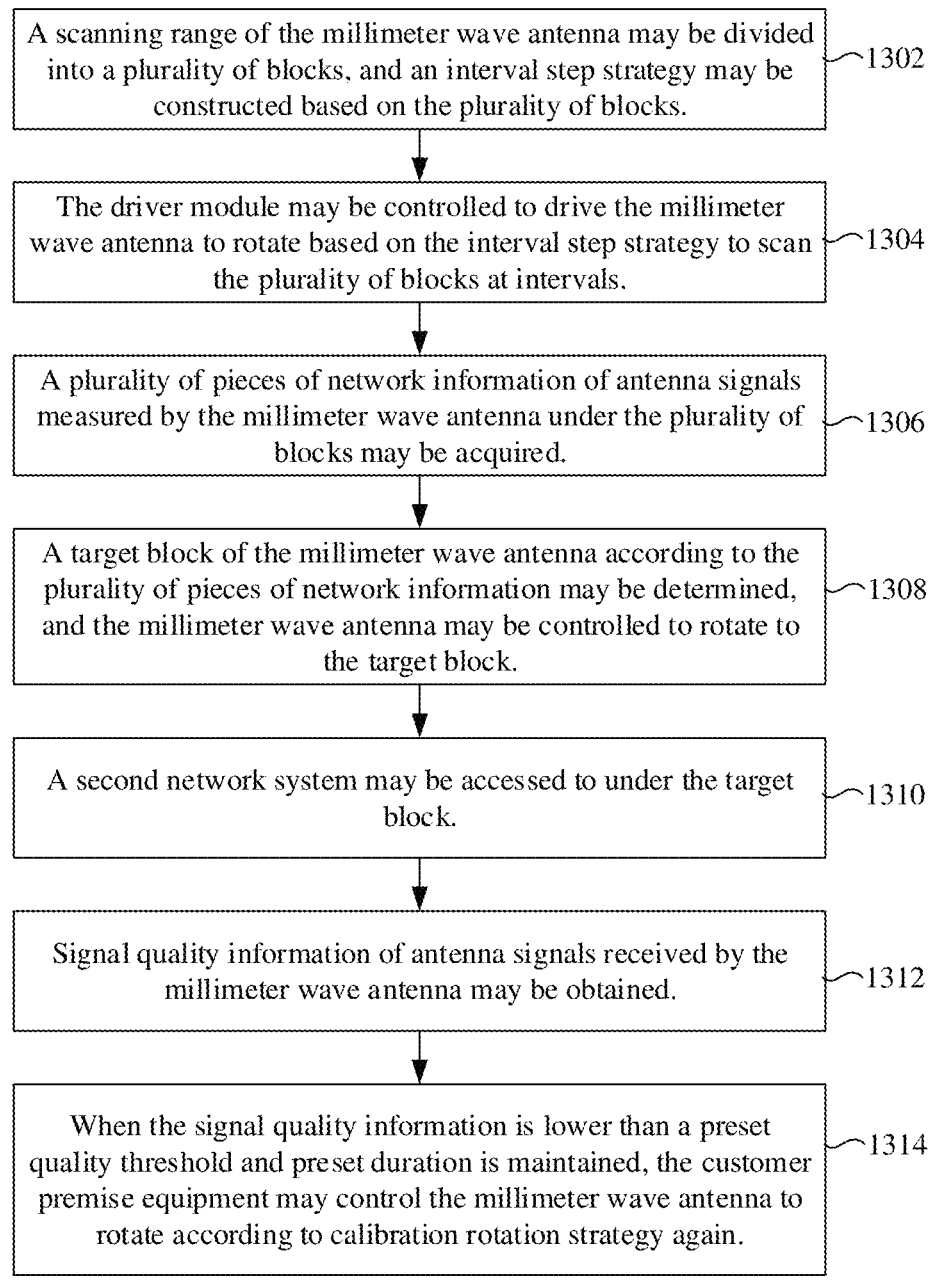
FIG. 13 is a flow chart of an antenna control method according to some other embodiments of the present disclosure.

Referring to FIG. 13, in some other embodiments, the antenna control method may include the operations illustrated at blocks 1302-1314.

At block 1302, a scanning range of the millimeter wave antenna may be divided into a plurality of blocks, and an interval step strategy may be constructed based on the plurality of blocks.

At block 1304, the driver module may be controlled to drive the millimeter wave antenna to rotate based on the interval step strategy to scan the plurality of blocks at intervals.

At block 1306, a plurality of pieces of network information of antenna signals measured by the millimeter wave antenna under the plurality of blocks may be acquired.

At block 1308, a target block of the millimeter wave antenna according to the plurality of pieces of network information may be determined, and the millimeter wave antenna may be controlled to rotate to the target block.

At block 1310, a second network system may be accessed to under the target block.

At block 1312, signal quality information of antenna signals received by the millimeter wave antenna may be obtained.

At block 1314, when the signal quality information is lower than a preset quality threshold and preset duration is maintained, the customer premise equipment may control the millimeter wave antenna to rotate according to calibration rotation strategy again.

When the customer premise equipment accesses to the second network system, the customer premise equipment can obtain the signal quality information of antenna signal received by the millimeter wave antenna. The signal quality information may include the signal-to-noise ratio, the received signal quality and the like. After the customer premise equipment accessing to the second network system, when the millimeter wave antenna receives the beam of the base station connected with the millimeter wave antenna, the signal quality information of the antenna signal received by the millimeter wave antenna will change with the current environment of the customer premise equipment. When the signal quality information is lower than the preset quality threshold value and lasts for a preset duration, the customer premise equipment may drop the network. Under these circumstances, the customer premise equipment can control the millimeter wave antenna to rotate according to the calibration rotation strategy to adjust the alignment direction between the millimeter wave antenna and the base station, and then improve the communication quality of the customer premise equipment.

It should be noticed that the preset quality threshold value and the preset duration can be set according to the antenna performance parameters of the millimeter wave antenna, the frequency band of the second network system received and transmitted by the millimeter wave antenna and other information. In the embodiment of the present disclosure, the preset quality threshold value and the preset duration are not be further limited.

In some embodiments, the calibration rotation strategy may include controlling the millimeter wave antenna to rotate again according to a recorded piece of network information of the millimeter wave antenna corresponding to each block.

In some embodiments, according to the piece of network information measured under each block, the customer premise equipment can determine a plurality of access blocks conforming to access to the second network system, determine the rotation priority according to the plurality of pieces of network information corresponding to the plurality of access blocks, and control the millimeter wave antenna to rotate according to the rotation priority. For example, the plurality of access blocks may be recorded as: first access block, second access block, . . . the n-th access block. the plurality of access blocks has a rotation priority from high to low. The customer premise equipment can control the millimeter wave antenna to rotate in rotation sequence of the first access block, the second access block, . . . , the n-th access block. For each rotation, it is necessary to judge whether the received signal quality information is lower than the preset quality threshold and lasts for a preset duration.

Furthermore, the customer premise equipment can control the millimeter wave antenna to rotate to the target access block according to the plurality of pieces of network information corresponding to the plurality of access blocks, so as to calibrate the alignment direction between the millimeter wave antenna and base station.

It should be understood that although the blocks in the flowchart of FIGS. 7-13 are shown in the order indicated by the arrows, the blocks are not necessarily executed in the order indicated by the arrows. Unless explicitly stated in this article, there is no strict sequence restriction on the execution of these steps, and these steps can be executed in other orders. Moreover, at least some blocks in FIGS. 7-13 may include a plurality of sub-blocks or sub-stages. The plurality of sub-blocks or sub-stages may be not necessarily completed at the same time, but can be executed at different times. The execution sequence of these sub-steps or sub-stages does not necessarily need to be carried out in sequence, but can be executed in turn or alternately with at least some other blocks and sub-blocks.

A customer premise equipment according to some other embodiments of the present disclosure is provided. The customer premise equipment may include a memory and a processor. The memory may store a computer program. When the computer program is executed by the processor, the processor executes the operations of an antenna control method and a plurality of antenna control method in any of the above embodiments.

A computer-readable storage medium according to some other embodiments of the present disclosure is provided. The computer-readable storage medium may include one or more nonvolatile computer-readable storage media containing computer executable instructions. When the computer executable instructions are executed by at least one processor, the least one processor perform the operations of an antenna control method and a plurality of antenna control method.

When a computer program product containing instructions is run on a computer, the computer performs the operations of an antenna control method and a plurality of antenna control method.

The non-transitory storage medium of the present disclosure mentioned above may include at least one non-volatile memory and volatile memory. The nonvolatile memory may include read-only memory (ROM), programmable ROM (PROM), electrically programmable ROM (EPROM), electrically erasable programmable ROM (EEPROM), or flash memory. The volatile memory may include random access memory (RAM), which serves as an external cache memory. As an illustration rather than a limitation, RAM can be available in various forms, such as static RAM (SRAM), dynamic RAM (DRAM), synchronous DRAM (SDRAM), dual data rate SDRAM (DDR SDRAM), enhanced SDRAM (ESDRAM), synchronous link DRAM (SLSRAM), rambus direct RAM (RDRAM), direct rambus dynamic RAM (DRDRAM), and rambus dynamic RAM (RDRAM).

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A customer premise equipment, comprising:
    a millimeter wave antenna configured to receive and transmit antenna signals in millimeter wave band;
    a radio frequency circuit coupled to the millimeter wave antenna and configured to control the millimeter wave antenna to receive and transmit the antenna signals, and measure a piece of network information of each antenna signal;
    a driver module coupled to the millimeter wave antenna to drive the millimeter wave antenna to rotate;
    a processor coupled to the radio frequency circuit and the driver module, wherein the processor is configured to:
        divide a scanning range of the millimeter wave antenna into a plurality of blocks;
        acquire scanning ranges of the plurality of blocks;
        determine a plurality of step values according to the scanning ranges of the plurality of blocks, wherein each step value is a scanning range between a current block and a previous block;
        determine an interval step strategy according to the plurality of step values;
        control the driver module to drive the millimeter wave antenna to rotate based on the interval step strategy to scan the plurality of blocks at intervals;
        acquire a plurality of pieces of network information of antenna signals measured by the millimeter wave antenna under the plurality of blocks; and
        determine a target block of the millimeter wave antenna according to the plurality of pieces of network information, and control the millimeter wave antenna to rotate to the target block.

2. The customer premise equipment according to claim 1, wherein scanning ranges of the plurality of blocks are the same, and a scanning range of each block is less than a preset angle.

3. The customer premise equipment according to claim 1, wherein each step value comprises at least one scanning range corresponding to at least one block.

4. The customer premise equipment according to claim 1, wherein at least two step values in the interval step strategy are equal or different.

5. The customer premise equipment according to claim 1, wherein the processor is further configured to:
    acquire a piece of network information measured by the millimeter wave antenna under a current block and a piece of network information measured by the millimeter wave antenna under a previous block; and
    update the interval step strategy according to the piece of network information measured by the millimeter wave antenna under the current block and the piece of network information measured by the millimeter wave antenna under the previous block.

6. The customer premise equipment according to claim 1, wherein the millimeter wave antenna comprises a plurality of radiation units, and the processor is further configured to:
    acquire a plurality of network data packets of the antenna signals received by the plurality of radiation units under a current block, wherein each network data packet comprises signal quality information of the antenna signals received by a corresponding radiation unit in different directions; and
    update the interval step strategy according to the plurality of network packets acquired by the plurality of radiation units under the current block.

7. The customer premise equipment according to claim 1, wherein the customer premise equipment works in a non-independent network mode, and the processor is further configured to:
receive a measurement instruction sent by a base station based on a first network system, wherein the measurement instruction at least comprises time information configured by the base station to indicate the customer premise equipment to measure the antenna signals, and the first network system is a 4G network system; and
control the driver module to drive the millimeter wave to rotate according to the measurement instruction based on the interval step strategy.

8. The customer premise equipment according to claim 7, wherein the measurement instruction further comprises a threshold value for access to a second network system, the second network system is a 5G network system and the processor is further configured to determine, when any piece of the network information is greater than or equal to the threshold value for access to the second network system, a block corresponding to the piece of the network information greater than or equal to the threshold value for access to a second network system as the target block.

9. The customer premise equipment according to claim 7, wherein the measurement instruction further comprises a threshold value for access to a second network system, the second network system is a 5G network system and the processor is further configured to access to the second network system when a piece of network information under each block is greater than or equal to the threshold value for access to the second network system, and obtain a plurality of pieces of beam information of the antenna signals received by the millimeter wave antenna and quit the second network system; and
determine the target block based on at least one piece of beam information under at least one block.

10. The customer premise equipment according to claim 1, wherein the processor is further configured to:
determine the target block of the millimeter wave antenna according to a piece of network information of the antenna signal measured by the millimeter wave antenna under each block, or,
transmit an omnidirectional network data to a base station, wherein the omnidirectional network data comprises the piece of network information of the antenna signals measured by millimeter wave antenna under each block and carries an acquisition request, and the acquisition request is configured to instruct the base station to determine the target block according to the omnidirectional network data.

11. The customer premise equipment according to claim 1, wherein the processor is further configured to:
access to a second network system under the target block, wherein the second network system is a 5G network system;
obtain a plurality of pieces of beam information of a current beam connected between the millimeter wave antenna and a base station based on the second network system; and
according to the plurality of pieces of beam information, control the millimeter wave antenna to rotate within a preset rotation range to calibrate a direction of the millimeter wave antenna to aim at the base station.

12. An antenna control method applied to a customer premise equipment, wherein the customer premise equipment comprises: a millimeter wave antenna configured to receive and transmit antenna signals in millimeter wave band; a radio frequency circuit coupled to the millimeter wave antenna and configured to control the millimeter wave antenna to receive and transmit the antenna signals, and measure a piece of network information of each antenna signal; a driver module coupled to the millimeter wave antenna to drive the millimeter wave antenna to rotate; a processor coupled to the radio frequency circuit and the driver module; wherein the method comprises:
dividing a scanning range of the millimeter wave antenna into a plurality of blocks, and constructing an interval step strategy based on the plurality of blocks, wherein the interval step strategy is in a rotation process, stepping from a current block to a next block in an interval step rotation, and the interval step rotation is a step rotation between the current block and a previous block by skipping one or more blocks or a step rotation between the current block and the next block by skipping one or more blocks;
controlling the driver module to drive the millimeter wave antenna to rotate based on the interval step strategy to scan the plurality of blocks at intervals;
acquiring a plurality of pieces of network information of antenna signals measured by the millimeter wave antenna under the plurality of blocks; and
determining a target block of the millimeter wave antenna according to the plurality of pieces of network information, and control the millimeter wave antenna to rotate to the target block.

13. The method according to claim 12, wherein the constructing the interval step strategy based on the plurality of blocks comprises:
acquiring the scanning ranges of the plurality of blocks;
determining a plurality of step values according to the scanning ranges of the plurality of blocks, and each step value is a scanning range between a current block and a previous block; and
determining the interval step strategy according to the plurality of step values.

14. The method according to claim 13, wherein each step value comprises at least one scanning range corresponding to at least one block.

15. The method according to claim 13, wherein at least two step values in the interval step strategy are equal or different.

16. The method according to claim 12, further comprising:
acquiring a piece of network information measured by the millimeter wave antenna under a current block and a piece of network information measured by the millimeter wave antenna under a previous block; and
updating the interval step strategy according to the piece of network information measured by the millimeter wave antenna under the current block and the piece of network information measured by the millimeter wave antenna under the previous block.

17. The method according to claim 12, wherein the millimeter wave antenna comprises a plurality of radiation units, and the method further comprises:
acquiring a plurality of network data packets of the antenna signals received by the plurality of radiation units under a current block, wherein each network data packet comprises signal quality information of the antenna signals received by a corresponding radiation unit in different directions; and
updating the interval step strategy according to the plurality of network packets acquired by the plurality of radiation units under the current block.

18. The method according to claim 12, wherein the customer premise equipment works in a non-independent network mode, and the method further comprises:

receiving a measurement instruction sent by a base station based on a first network system, wherein the measurement instruction at least comprises time information configured by the base station to indicate the customer premise equipment to measure the antenna signals, and the first network system is a 4G network system; and controlling the driver module to drive the millimeter wave to rotate according to the measurement instruction based on the interval step strategy.

19. The method according to claim 12, wherein scanning ranges corresponding to the plurality of blocks are the same, and a scanning range of each block is less than a preset angle.

20. A non-transitory storage medium storing instructions that, when executed by a processor, cause the processor to perform:

controlling a millimeter wave antenna to rotate based on an interval step strategy to scan a plurality of blocks at intervals; wherein the plurality of blocks are divided from a scanning range of the millimeter wave antenna, wherein the interval step strategy is in a rotation process, stepping from a current block to a next block in an interval step rotation, and the interval step rotation is a step rotation between the current block and a previous block by skipping one or more blocks or a step rotation between the current block and the next block by skipping one or more blocks;

acquiring a plurality of pieces of network information of antenna signals measured by the millimeter wave antenna under the plurality of blocks; and controlling the millimeter wave antenna to rotate to a target block of the millimeter wave antenna, wherein the target block is determined according to the plurality of pieces of network information.

\* \* \* \* \*